(12) United States Patent
Doshi et al.

(10) Patent No.: US 11,662,222 B2
(45) Date of Patent: May 30, 2023

(54) SENSOR MANAGEMENT AND RELIABILITY

(71) Applicant: Intel Corporation, Santa Clara, CA (US)

(72) Inventors: Kshitij Arun Doshi, Tempe, AZ (US); Tao Zhong, Beijing (CN); Gang Yi Deng, Irvine, CA (US); Zhongyan Lu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/740,599

(22) Filed: May 10, 2022

(65) Prior Publication Data

US 2022/0377141 A1 Nov. 24, 2022

Related U.S. Application Data

(63) Continuation of application No. 16/466,770, filed as application No. PCT/CN2017/000046 on Jan. 3, 2017, now Pat. No. 11,402,235.

(51) Int. Cl.
| | |
|---|---|
| *G01D 21/00* | (2006.01) |
| *H04L 67/12* | (2022.01) |
| *G01D 3/08* | (2006.01) |
| *G01D 3/10* | (2006.01) |
| *G16Y 20/20* | (2020.01) |
| *G16Y 40/20* | (2020.01) |

(52) U.S. Cl.
CPC ............... *G01D 3/08* (2013.01); *G01D 3/10* (2013.01); *G01D 21/00* (2013.01); *H04L 67/12* (2013.01); *G16Y 20/20* (2020.01); *G16Y 40/20* (2020.01)

(58) Field of Classification Search
CPC . G01D 3/08; G01D 3/10; G01D 21/00; G05B 23/0283; G05B 23/0294; H04L 67/12
USPC ..... 700/108; 702/34, 57, 104, 182–184, 188
See application file for complete search history.

(56) References Cited

U.S. PATENT DOCUMENTS

| 5,796,007 A | 8/1998 | Panagotopulos et al. |
| 9,323,340 B2 | 4/2016 | Pantel |
| (Continued) | | |

FOREIGN PATENT DOCUMENTS

| CN | 102538859 | 7/2012 |
| CN | 104596564 | 5/2015 |
| (Continued) | | |

OTHER PUBLICATIONS

United States Patent and Trademark Office, "Final Office Action," issued in connection with U.S. Appl. No. 16/466,770, dated Nov. 15, 2021, 12 pages.

(Continued)

*Primary Examiner* — Jeffrey P Aiello
(74) *Attorney, Agent, or Firm* — Hanley, Flight & Zimmerman, LLC

(57) ABSTRACT

A system and method for managing sensors including determining health operation states of the sensors correlative with sensor accuracy, classifying the sensors by their respective health operation state, and teaming two sensors each having a health operation state that is intermediate to give a team having a health operation state that is healthy. The sampling frequency of the sensors to determine sensor accuracy may be dynamic.

15 Claims, 20 Drawing Sheets

(56) References Cited

U.S. PATENT DOCUMENTS

| | | |
|---|---|---|
| 10,215,619 B1 * | 2/2019 | Kovacs .................. G01G 19/50 |
| 11,402,235 B2 | 8/2022 | Doshi et al. |
| 2002/0088268 A1 | 7/2002 | Parker |
| 2004/0120557 A1 * | 6/2004 | Sabol ..................... G09B 23/28 382/128 |
| 2004/0122703 A1 * | 6/2004 | Walker .................. G16H 50/70 706/45 |
| 2004/0122719 A1 * | 6/2004 | Sabol ................ G06Q 30/0204 705/7.29 |
| 2004/0122790 A1 * | 6/2004 | Walker .................. G16H 30/40 |
| 2007/0171038 A1 | 7/2007 | Maekawa |
| 2009/0055691 A1 | 2/2009 | Ouksel |
| 2012/0265465 A1 * | 10/2012 | Tsai ....................... G01N 29/14 702/77 |
| 2013/0100062 A1 | 4/2013 | Lee |
| 2014/0358468 A1 | 12/2014 | Kim et al. |
| 2016/0377528 A1 | 12/2016 | Chapuis |
| 2017/0261971 A1 | 9/2017 | Schulze et al. |
| 2017/0270563 A1 | 9/2017 | Soni et al. |
| 2017/0309088 A1 * | 10/2017 | Arya ....................... G07C 5/008 |
| 2018/0288599 A1 | 10/2018 | Zhao et al. |
| 2019/0174207 A1 | 6/2019 | Celia et al. |
| 2020/0225655 A1 * | 7/2020 | Cella .................... G05B 23/024 |

FOREIGN PATENT DOCUMENTS

| | | | |
|---|---|---|---|
| CN | 105425775 A | * | 3/2016 |
| CN | 105425775 A | | 3/2016 |
| DE | 112017006715 | | 11/2019 |
| WO | 2006124971 | | 11/2006 |
| WO | 2018126339 A1 | | 7/2018 |

OTHER PUBLICATIONS

United States Patent and Trademark Office, "Notice of Allowance and Fees Due," issued in connection with U.S. Appl. No. 16/466,770, dated Feb. 8, 2022, 10 pages.

United States Patent and Trademark Office, "Non-Final Office Action," issued in connection with U.S. Appl. No. 16/466,770, dated May 11, 2021, 12 pages.

International Searching Authority, "International Preliminary Report on Patentability," issued in connection with PCT Patent Application No. PCT/CN2017/000046, dated Jul. 2, 2019, 4 pages.

United States Patent and Trademark Office, "Corrected Notice of Alowability," issued in connection with U.S. Appl. No. 16/466,770, dated May 25, 2022, 4 pages.

International Searching Authority, "Written Opinion," issued in connection with PCT Patent Application No. PCT/CN2017/000046, dated Sep. 28, 2017, 3 pages.

International Searching Authority, "International Search Report," issued in connection with PCT Patent Application No. PCT/CN2017/000046, dated Sep. 28, 2017, 3 pages.

International Bureau, "International Preliminary Report on Patentability," issued in connection with PCT Patent Application No. PCT/CN2017/000046, dated Jul. 9, 2019, 4 pages.

* cited by examiner

100

300

1000

1100

1400

1500

SENSOR MANAGEMENT AND RELIABILITY

CROSS REFERENCE TO RELATED APPLICATIONS

This application is a continuation of U.S. application Ser. No. 16/466,770, filed Jun. 5, 2019, which is a U.S. National Stage Application under 35 U.S.C. 371 International Patent Application No. PCT/CN2017/000046, filed on Jan. 3, 2017, all of which are incorporated by reference in their entirety.

TECHNICAL FIELD

The present techniques relate generally to sensors and, more particularly, to sensor management and reliability including with Internet of Things (IoT) sensors in IoT systems.

BACKGROUND

Sensors have proliferated in public, industrial, commercial, and private environments. Sensors may sense and measure characteristics of objects and environmental variables, other features, and so on. Large amounts of data may be collected via the sensors. Sensors may lose accuracy or malfunction over time. Furthermore, the Internet of Things (IoT) may bring Internet connectivity to as many as 50 billion devices by 2020. For organizations, IoT devices including IoT sensors may provide opportunities for monitoring, tracking, or controlling other devices and items, including further IoT devices, other home and industrial devices, items in manufacturing and food production chains, and the like.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
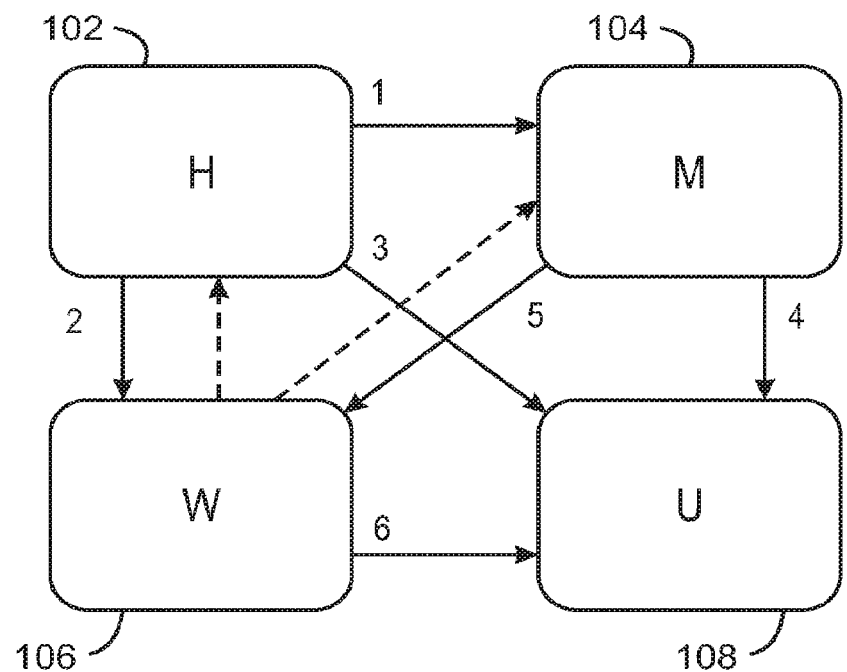
FIG. 1 is a diagram representation depicting four health grades or states of a sensor or device in accordance with embodiments of the present techniques.

The present techniques are directed generally to improving accuracy and reliability of IoT devices. As discussed below, machine learning may be involved. Moreover, multiple devices or sensors may be programmed or configured into collaborative arrangements for collective operation.

Embodiments, such as a sensor manager, may manage sensors in a system including to determine health operation states of the sensors correlative with accuracy of the sensors, and to classify the sensors in operation in real time by their respective health operation state. The system may be an IoT system and the sensors are IoT sensors. A computing device in which the sensor manager is implemented may include an IoT gateway device, a cloud computing device, or an IoT smart sensor, or any combination thereof. Moreover, determining health operation states of sensors may be an adaptive assessment of sensor health in which sampling frequency of a sensor to assess the sensor is a function of accuracy drift of the sensor or of probability the sensor will remain in a current health operation state, or a combination thereof.

In examples, the health operation states of the sensors include a healthy (H) state, an unhealthy (U) state, and an intermediate or intervening state in which sensed data is less accurate than for the H state and more accurate than for the U state. In some examples, sensor data from an H state sensor is substantially accurate or at least 90% accurate, and sensor data from the U state sensor data is not acceptable. The technique may involve isolating data from a U state sensor. In certain instances, two sensors having the intermediate state may be teamed such that the team has the H state. Moreover, in particular examples, there are multiple intermediate states including a moderately healthy (M) state and a weak healthy (W) state. For an M state sensor, some sensed data is accurate and other sensed data is inaccurate, or sensed data deviation from accurate follows a pattern, or a combination thereof. A W state sensor generally cannot be used alone outside of a team.

One example includes teaming or associating an M state sensor with an H state sensor to reduce exposure of the H state sensor. To do so, a domain for which the M state sensor is accurate is determined. In operation, the H state sensor is deactivated in response to the M state sensor readings occurring in the domain. The H state sensor is activated in response to the M state sensor readings occurring outside of the domain. In another example, the technique treats a grouping of multiple W state sensors as a single logical sensor in the H state or M state.

Determining the health operation states of the sensors may involve parametrizing an environment in which the sensors are disposed. Determining health operation states may involve sampling the sensors and comparing sampled data against a reference sensor. The sampling frequency can be dynamic. For example, increasing sampling frequency of a sensor may be correlative with increasing deployment duration of the sensor. The technique may accelerate increasing sampling frequency in response to the sensor reporting abnormal values, or in response to greater utilization of a sensitive part of the sensor.

IoT devices including IoT sensors may be low-power devices stationed in noisy and failure-inducing environments. For example, smart energy meters may be subject to electromagnetic and thermal interference, and oceanographic sensors in salty (corrosive), weedy, and untethered operation. These adverse environmental conditions may limit or reduce the sensor operational lives. Frequent repair of the sensor devices may not be pragmatic.

One option to reduce maintenance costs may be a highly-reliable device option in which high-margin designs of sensors are employed. However, these higher quality sensors can be costly and consume more power. Another option may be a redundant device option in which replacements of the IoT sensors are prepackaged and bring the replacement IoT sensors online when the initially operating IoT sensors in the package fail.

Yet, these two options and other options may have limitations. For instance, the highly-reliable device option may be costly and not always feasible within a given technology or because of design constraints. Further, even with more expensive devices deployed, there may nevertheless be open-ended risk including without some redundancy. Moreover, the redundant device option may involve over-provisioning and deliver diminishing results, as sampling readings from active and standby devices for health assessment can reduce endurance.

Conversely, embodiments herein may combine a proactive and reactive strategy using redundant devices in a unique way to amortize cost from modest overprovisioning over a longer total lifespan for a device. Further, some embodiments may reduce the need to sample a device to determine its health, boosting endurance. Indeed, certain embodiments provide an adaptive assessment of device health, and finding and isolating or correcting inaccurate sensors. The techniques may derive parameters for the adaptive operation giving adaptive duty cycles in assessing device health such as with sampling frequency. For a healthy sensor with a high probability to remain healthy, the frequency of assessing device health may be less compared to if the healthy sensor has low probability to remain healthy. Thus, the duty cycle of sampling the sensor (to compare the sampled data to a reference device) may be adaptive.

In general, consider an air quality monitoring system (AQMS) for a city as an example. An AQMS may involve several hundred more air quality monitoring devices (AQMDs) to be deployed. Accuracy of an AQMD may reduce over time due to deposition of micro-particulates on its sensor surfaces. In a particular example, an AQMD may be installed aloft (e.g., on an electric line pole) or in some way to reduce interference with the AQMD operation. Thus, because of the aloft disposition, labor cost to repair the AQMD can be high. Therefore, a long usable life without manual intervention may be beneficial. Yet, over time, am AQMD may eventually lose sufficient accuracy due to the microparticulates and other contaminants, and other factors, leading to a need to replace the AQMD. The health of several hundred AQMDs may be assessed on a continuous basis, and replacement AQMDs activated as presently-operating AQMD devices fail to perform with desired or needed accuracy. Even with such overprovisioning, additional repair/install costs may be incurred when the loss of accuracy is steeper than planned such as due to device variations, environment, weather, industrial events, etc.

The present techniques may address at least the following four general aspects: (1) spectrum of health; (2) drift, classification, and teaming; (3) avoiding oversampling; and (4) avoiding stress on the reference device. Again, the first general aspect of may be a spectrum of health. Indeed, the devices may be capable of having a spectrum of states between healthy and unhealthy. Certain embodiments may employ multiple average mean-time-between-failure (MTBF) devices such as with a redundant device option as alluded to above. As discussed below, the techniques may account for multiple grades or states of health with respect to the operation of the sensor or device. With respect to spectrum of health of the device or sensor operation, some examples employ low-cost devices but derive a residual value (e.g., long-duration) from a device after the device drops in accuracy. This harnessing of partial value from the varying intermediate health zones of operation for devices may reduce overprovisioning and achieve higher accuracy.

A second general aspect may address drift, classification, and teaming. The techniques may capitalize on teaming multiple devices that are in intermediate states between healthy and unhealthy to deliver a cumulative healthy operation, by mining residual useful value from a partially healthy device. To explain, device failure may depend on the IoT subdomain and may not be sudden. The gradual loss of accuracy can allow for a device to continue to be used effectively in some examples with declining accuracy. The teaming strategy may depend on both the available accuracy and the zone of operation. For instance, a temperature sensor may be 10% inaccurate in range from 80° C. to 100° C., but only 5% inaccurate in range from 20° C. to 80° C. Multiple factors taken together may be used to extract higher value from partial function.

The discussion now turns to elaboration of reliable versus redundant device options alluded to above. As mentioned, low power IoT devices may be stationed in problematic environments. For example, smart energy meters may be subject to electromagnetic and thermal interference. Oceanographic sensors may be in a corrosive and untethered operation. The IoT sensors can have limited durations over which they can function accurately. For sensors reporting data, or actuators receiving and executing some action, there is non-trivial likelihood that either bad data is being reported or desired actions are not being performed as desired. Such may be labeled as drift from desired behavior generally and as loss of accuracy.

Replacing or repairing IoT devices that have drifted to lower levels of accuracy may not be practical and may be expensive even if the devices themselves are not expensive. One approach to address this issue is a reliable device option in which high-quality IoT devices are employed. For example, the option installs and utilize devices with high reliability and availability, whose accuracy drift is 1/N that of an ordinary device where N>>1. A second approach is a redundant device option which is to install redundant IoT devices, and deactivate those devices detected to have lost accuracy, while activating newer devices installed. These two options may be combined as well, which could be labeled as a third option.

Yet, the reliable device option can be expensive because cost of higher-quality devices can grow (e.g., significantly) with increasing levels of accuracy. Further, constraints of technology and physics, and errors forced by uncontrollable environmental factors, such as noise, heat, vibrations, etc., may limit reliability. Moreover, if there is no redundancy also implemented with the reliable device option, the detection of a device malfunction may be difficult or problematic in some instances.

However, the redundancy option such as shifting from current to new devices, how long a device will perform well is not typically knowable in advance and, thus, device replacement is generally conservatively planned, which may cause overprovisioning. Further, to detect level of inaccuracy, the data and response from one device may be checked and compared with reference devices. Frequent sampling reduces operational life of a device but infrequent sampling raises uncertainty or inaccuracy.

Certain embodiments herein combine a proactive and a reactive technique. For instance, embodiments employ redundant devices (e.g., low cost) but instead of or in addition to identifying and displacing underperforming devices with provisioned new devices, the examples define intermediate zones of device operation in which underperforming devices continue to deliver value. The harnessing of different value from different devices in varying stages of performance may facilitate lower cost and higher accuracy.

As mentioned, a multi-state (e.g., four-state) division of operation life of a device or sensor may be implemented. Indeed, operation of sensors may be classified according to accuracy and reliability into multiple states (e.g., four states). In a particular example, four states are (1) healthy state H, (2) moderately healthy state M, (3) weak healthy state W, and (4) unhealthy state U. While other examples of state names and definitions are applicable, the four states of this particular example are defined as below. First, a sensor in the healthy state H is when data collected by the sensor is accurate and reliable, and the sensor can work alone, as conventional. For the unhealthy state U, data from the sensor is unacceptable and not usable.

A sensor in the moderate healthy state M is when data collected by the sensor is not completely accurate and reliable, and sometimes needs to be corrected by data from another sensor. That is, the M sensor can work alone much of the time, but generally needs to be complemented by other sensors for some conditions. Data collected by the M sensor may be characterized by one or both of at least the following: (a) data is accurate in specific situations; and/or (b) data deviation follows a generally fixed pattern.

In other words, for (a), part of data collected by an M sensor is accurate. Data is accurate when the value the sensor measured is in a particular scope, in specific time duration, and/or in a particular environment such as specific condition for temperature, humidity, air pressure, etc. However, the data may be less accurate in other situations. As for (b) data deviation following a fixed pattern to give a M state for a sensor, that although data is not accurate, the data deviates from the correct result by a knowable parameter or curve, specific value, percentage, etc. Thus, for example, the sensor can be logically recalibrated or normalized, or values can be interpolated or extrapolated within acceptable margins of error, and so forth.

A sensor is in the weak healthy state W if the data is not accurate or reliable for the sensor to be used alone, but the sensor may be acceptably teamed with other sensors. In other words, with device teaming, e.g., taking outputs from other sensors also in W state (or from sensors in M state or H state), procedural or statistical techniques can make the data sufficiently accurate. Thus, a group of sensors in W state, for example, can be grouped and treated as a single logical sensor in H or M state.

The third general aspect mentioned above may be avoiding or reducing oversampling, and capturing environment impact. Drift of accuracy may follow a pattern that is decipherable as a function of environmental and usage factors. In other words, the range of effective operation can be assessed from dynamic measurement, whose frequency is adjustable according to current health, recent trajectory, stress, etc. By adapting both the margin of operation and the stress imposed on a device to assess sensor accuracy to the sensor role and current health, embodiments may prolong the duration of the sensor effectiveness, whether individually or in teamed operation with other sensors.

The fourth general aspect mentioned above may be directed to avoiding or reducing stress on a reference device. A state of operation of a first device may be as a non-teamed healthy device. In that state, reference readings may be obtained from at least one second device (a reference device) for assessing accuracy of the first device. Embodiments may tune frequency with which a second device is to be consulted. Similarly, with a second state of operation for a first team of devices in which that collective operates as a proxy for a healthy device, obtaining reference readings from one or more second devices (reference devices) to corroborate healthy operation of the first team of devices may be beneficial. Examples may incorporate a similar adaptive adjustment of the rate at which such readings are taken from the one or more second devices.

FIG. 1 is a diagram 100 representation depicting four health grades or states of a sensor or device. In other examples, more or less than four health states and descriptions may be employed. In this example, the multiple grades of operation or states include healthy (H) 102, moderately healthy (M) 104, weakly healthy (W) 106, and unhealthy (U) 108. As discussed, the H state 102 may mean the device is capable of normal operation by itself. The M state 104 may mean the device yields sufficiently accurate or reliable function over at least one set of operational range, and yields less than sufficient accuracy or margin of error in at least one different range where the device may team with other devices for correction. The W state 106 may mean device yields insufficient accuracy or reliability on its own, but can be teamed with other devices in M or W states for desired margin of error. Lastly, the U state 106 may mean the device has dropped below a level of reliability such that that device cannot be useful including alone or in teamed operation. Again, more gradations are possible than the four states depicted.

With respect to the second general aspect listed above alluding to drift, classification, and teaming, FIG. 1 depicts two types of example arrows as state transitions. Solid arrows (1, 2, 3, 4, 5, 6) correspond to drifts over time from higher to lower states. The dashed arrows correspond to combined operation of lower state devices to produce a teamed, higher state operation. Thus, in the illustrated example, the arrows 1, 2, and 3 may indicate that a sensor or device in the H state 102 drifts or shifts to the M state 104, W state 106, or U state 108, respectively. The arrows 4 and 5 indicate that a sensor or device in the M state 104 may drift or shift to the W state 106 and U state 108, respectively. Lastly, the dashed arrows indicate that a device(s) in the M state 104 or W state 106 may be corrected by teaming to give in certain examples the H state 102 for the team of sensors or devices.

Figure 2:
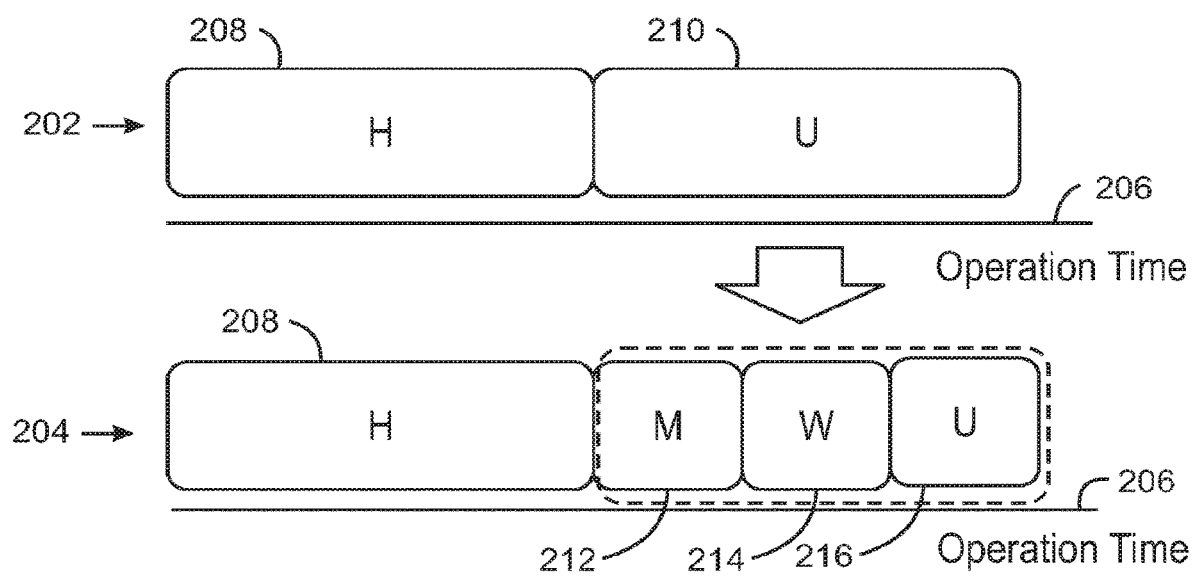
FIG. 2 is a diagram representation of loss of sensor accuracy and with regard to the four health grades in accordance with embodiments of the present techniques.

FIG. 2 is a diagram 200 representation of loss of sensor accuracy and with regard to the four health grades or states of a sensor or device as discussed with respect to FIG. 1. The first depiction 202 gives device health as two states over operation time 206, a H state 208 and an unhealthy U state 210. The second depiction 204 gives the device health as four states over the operation time 206. In particular, depiction 204 differentiates as a better representation of the U state 210 as an M state 210 and W state 214, and a U state 216 in which the device is unusable.

In many situations, such as with weather sensors, smart meters, health monitors, etc., reliability or operational acuity drifts gradually from higher to lower states, as indicated in FIGS. 1 and 2. The increasing loss of accuracy or health may be cumulatively over time and variable due to different levels of usage and environmental stresses, pollution, etc. Moreover, a device with less than normal operation in one set of conditions can deliver acceptable usage over other sets of conditions. Embodiments provide for determining the current operational range, pattern of drift into a lower state of operation, and conditions defining the pattern which may be measurable. Associated policies may govern whether the current external factors indicate a device to be treated as in M or W mode (or others, depending on how many categories of operation are defined), so that judicious teaming and stress distribution may be achieved. In particular, it may be beneficial to detect, isolate, and/or correct the behaviors of subnormal devices, as depicted in the example of FIG. 3.

Figure 3:
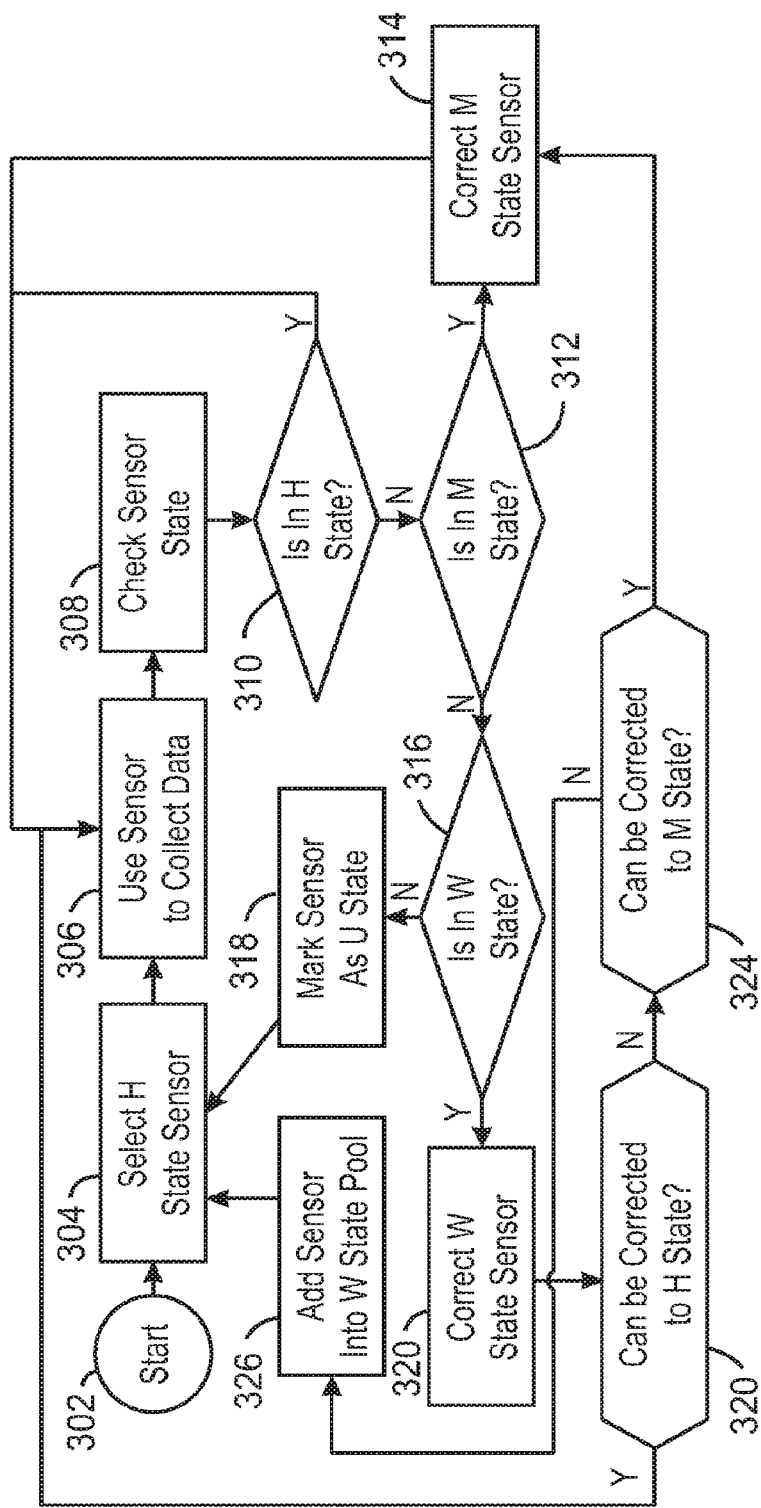
FIG. 3 is a block flow diagram of a method of addressing subnormal devices in accordance with embodiments of the present techniques.

FIG. 3 is a method 300 of addressing subnormal devices. At block 302, the method starts. At block 304, the method selects an H state sensor. At block 306, the sensor is used to measure and collect data. At block 308, the method checks the sensor state. In particular, at block 310, the method determines if the sensor has remained in the H state such as by sampling the sensor and comparing the sampled data to a reference. If the sensor has remained in the H state, the sensor is used to continue to collect data, as noted in block 306. If at block 310, the method determines that the sensor is not in the H state, the method then decides at block 312 if the sensor is in the M state. If yes, the method at block 314 corrects this now M state sensor by teaming and continues to collect data with the sensor as noted in block 306. Again, the correction may involve teaming the M state sensor with other sensors. If the sensor is not in the M state, the method at block 316 determines if the sensor is in the W state. If no, the method at block 318 marks the sensor as in the U state and then selects another H state sensor in block 304 for continued analysis. If the sensor is in the W state, the method at block 320 corrects the W state sensor by teaming. In particular, if the sensor is corrected to the H state by teaming as questioned in block 320, the method continues to use the sensor to collect data as noted in block 306. If the sensor cannot be corrected via teaming to the H state, the method corrects the sensor to the M state by teaming as indicated in blocks 324 and 314, and continues to collect (block 306) data with the sensor. Again, the corrections may involve teaming the sensor with other sensors. If the sensor cannot be corrected to the M state, the method in block 326 adds the sensor into the W state pool. The W state sensor may be available to be teamed with other sensors where applicable.

Figure 4:
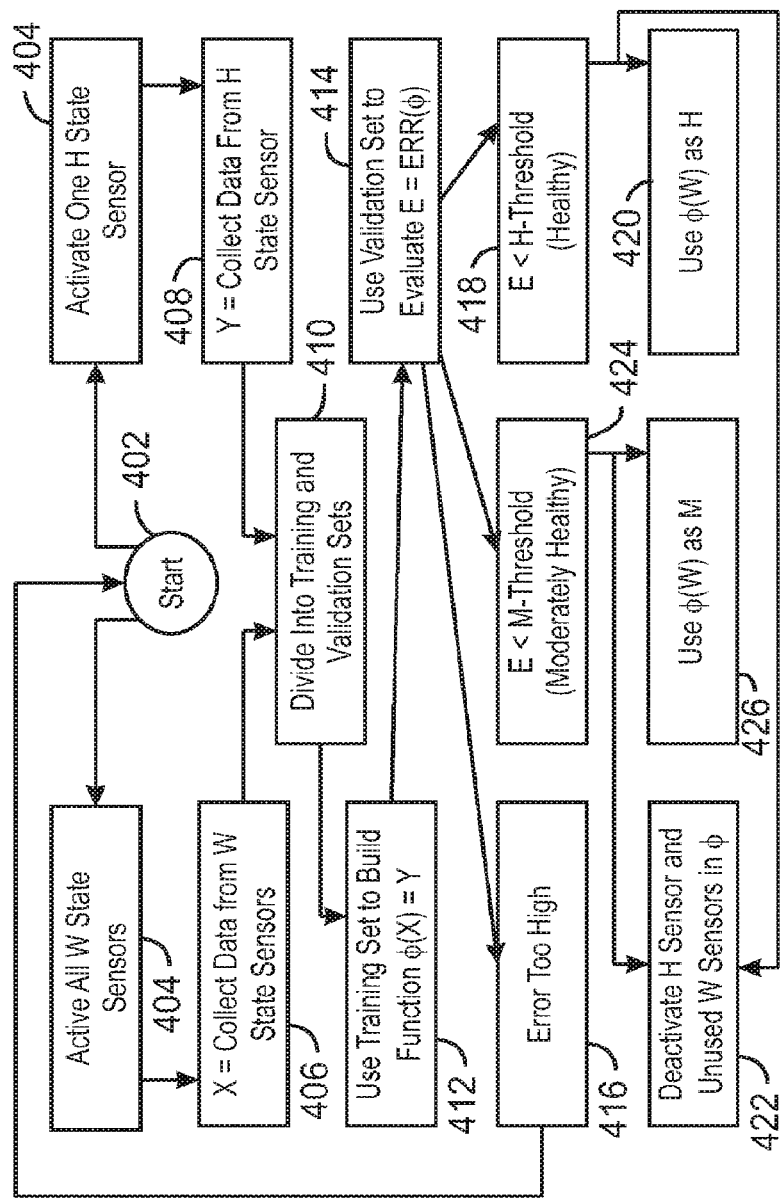
FIG. 4 is a block flow diagram of a method of correcting sensors in accordance with embodiments of the present techniques.

FIG. 4 is a method 400 of correcting sensors. In particular, the example method 400 corrects M state sensors to H state, and corrects W state sensors to either M state or H state. Achieving the M state or H state function may be through collaboration among multiple W state devices. A subnormal sensor may be corrected by teaming with other sensors. In examples, the subnormal sensor itself is not affected (e.g., not repaired or corrected) but the subnormal sensor is retained as useful and corrected in the sense of being utilized in a team and providing accurate or supplemental readings where applicable. Moreover, FIG. 4 indicates how a sensor may be classified over time based on the state or previous state of the sensor. The technique may chart progression from H to M, W, or U, and progression from W to U, as indicated in FIG. 4. Embodiments not depicted in FIG. 4 may similarly account for progression from M to W or U states.

At block 402, the method starts. The method may activate most or all W state sensors and activate an H state sensor, as noted respectively in the two blocks 404. At block 406, the method collects data with or from the W state sensors. At block 408, the method collects data with or from the H state sensor. At block 410, the data from the W state sensors and the H state sensor are divided into training and validation sets. At block 412, the method uses a training set to build a function of W state sensor data and H state sensor data. At block 414, a validation set is used to evaluate error. If the error is too high (block 416), the method returns to start 402. If the error satisfies a M (moderately healthy) threshold (block 434), the W state sensors may be teamed or collaborated as M sensors (block 426). If the error satisfies a H (healthy) threshold (block 418), the W state sensors may be teamed or collaborated as H sensors (block 420). In either case, the method in block 422 where applicable deactivates the H sensor and unused W sensors.

As mentioned, the third general aspect listed above may be directed to avoiding or reducing oversampling, and capturing environment impact in assessment and correction of sensor accuracy. For a device performing normally, frequent detection (i.e., sampling) can reduce operational life of the device. For instance, frequently sampling air quality can cause more particulate deposits on an AQMD device described in the example above. Under-sampling can cause operating for longer periods without knowing the accuracy and reliability of a sensor. Embodiments may strike a balance, as implied in FIG. 5.

Figure 5:
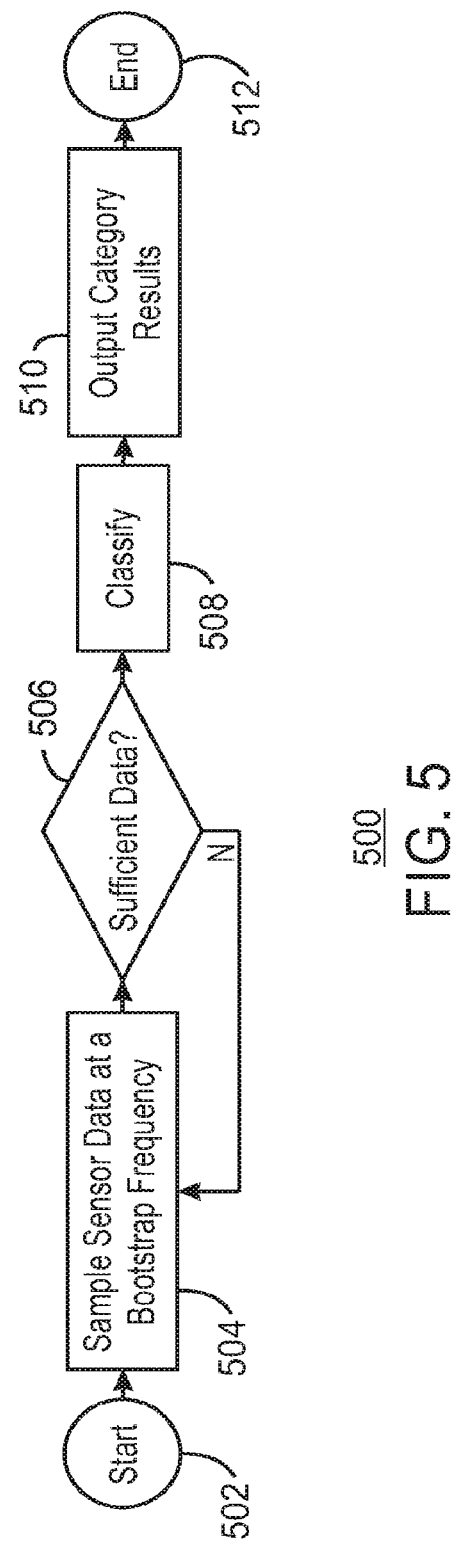
FIG. 5 is a block flow diagram of a method of classifying a sensor in accordance with embodiments of the present techniques.

FIG. 5 is a method 500 of classifying a sensor. At block 502, the method starts. At block 504, the method samples sensor data such as at a bootstrap frequency. Other frequencies are applicable. At block 506, if the method determines there is sufficient data, then at block 508 the method classifies the sensor. On the other hand, if the amount of data sampled for that sensor is not sufficient, the method returns to block 504 and continues to sample sensor data. At block 510, the method outputs sensor category results. At block 512, the method ends.

Devices may have a natural range of variation, as does the environment that the devices are disposed. A baseline frequency, for example determined from offline training, may be employed in the collection of data. The data may be compared against a reference device or a set of reference devices in the same or similar environment. A classification technique such as K-means clustering can be employed by a computing device in a backend or cloud to determine whether a sensor device falls out of the cluster of reference readings. Embodiments may avoid being restrained to classification under lab conditions by factoring in impact of environment. Moreover, once a device is known to be in H state, an issue may be avoiding or reducing oversampling from that point in time. Thus, certain embodiments may fit the device sampling to a current trajectory of behavior including accuracy drift (e.g., FIG. 6) and probability (e.g., FIG. 7).

Figure 6:
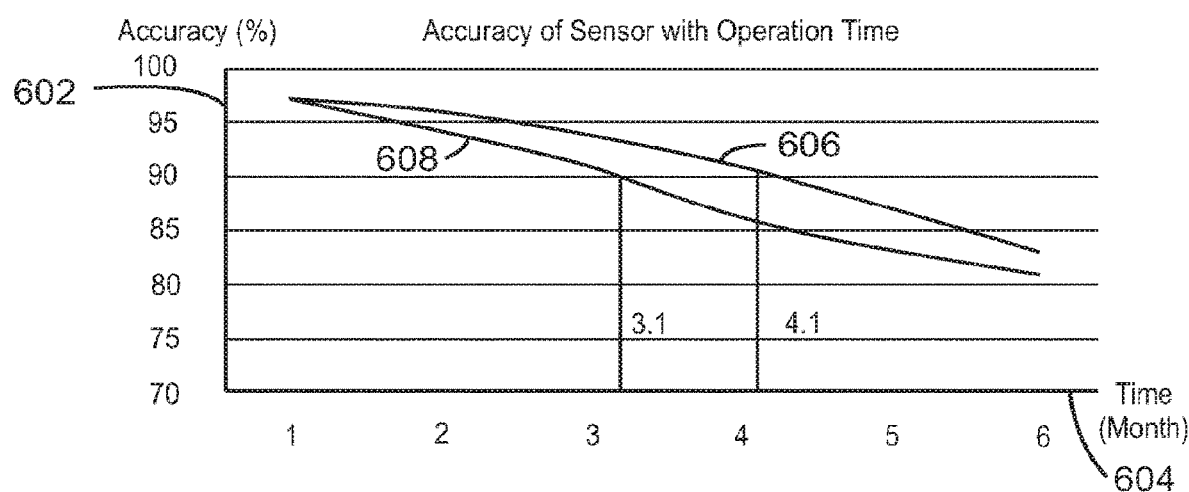
FIG. 6 is a plot of sensor accuracy over operation time.

FIG. 6 is a plot 600 of sensor accuracy 602 over operation time 604 of the sensor. The accuracy drift over time may be experienced due to declining health of the device. In this particular illustration, FIG. 6 is a plot 600 of sensor accuracy 602 in percent (%) over operation time 604 in months.

A good or more reliable device (sensor) is likely to show slower accuracy decline compared to a bad or less reliable device. In the illustrated example, the curve 606 is for a better device in which the accuracy declines to about 90% accurate at about 4.1 months. The curve 606 is for the less reliable device that declines faster to 90% accuracy at 3.1 months. Moreover, sampling frequency of a sensor to assess health or reliability of the sensor may be a function of the percent accuracy of the sensor, the rate of decline of percent accuracy of the sensor, the duration of deployment of the sensor, and so forth.

Figure 7:
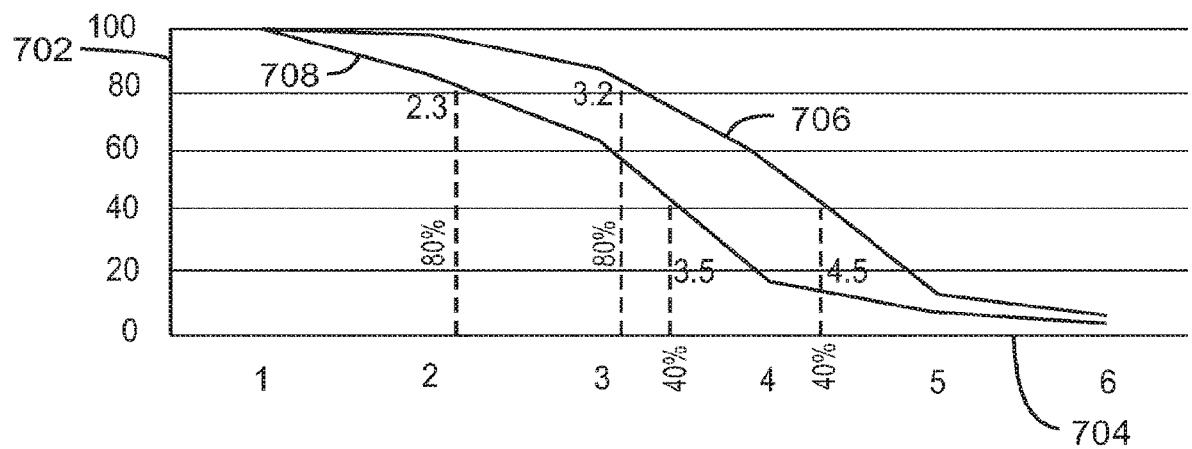
FIG. 7 is a plot of probability that a sensor state does not change.

FIG. 7 is a plot 700 of probability that a sensor state stays or remains in that state given the current environmental exposure of the sensor. Different probabilities of staying in the same state may be experienced for a device under different conditions and over time. FIG. 7 is a plot 700 of probability 702 in percent (%) over operation time 704 in months. Again, the probability 702 axis is the probability that a health state of a sensor remains unchanged. The time 704 axis is in months as with FIG. 6. In the illustrated example, the two curves 706 and 708 each represent a different device under the same or different environmental condition, or the curves 706 and 708 represent the same device under different respective environment conditions. The curve 706 indicates an overall greater probability over time that the health state remains the same than the curve 708.

Two probabilities arbitrarily chosen for consideration are 80% and 40%. In this example, the curve 706 (e.g., the good scenario) indicates that at about 3.2 months there is an 80% probability the health state remains the same, and at about 4.5 months there is only a 40% probability the health state remains the same. The curve 708 (e.g., the bad scenario) indicates that at about 2.3 months there is an 80% probability the health state remains the same, and at about 3.5 months there is a 40% probability the health state remains the same. Moreover, sampling frequency of a sensor to assess health or reliability of the sensor may be a function of this probability.

Indeed, for example, a sampling policy might be of the form: for a probability band between 1 and 0.8 (e.g., for up to 3.2 months for the depicted good scenario and for up to 2.3 months for the depicted bad scenario), choose a relaxed sampling interval (e.g., say once every 15 minutes); for that between 0.8 and 0.4, choose a faster sampling interval (e.g., say once every 5 minutes); and then below 0.4, choose a much higher sampling interval (e.g., say once a minute) if a sensor remains in H state at each of those time junctures. Of course, many other probability ranges and sampling interval times (frequencies) may be considered. In all, these estimates may lead to techniques for deciding sampling duration, such as shown in FIG. 8.

Figure 8:
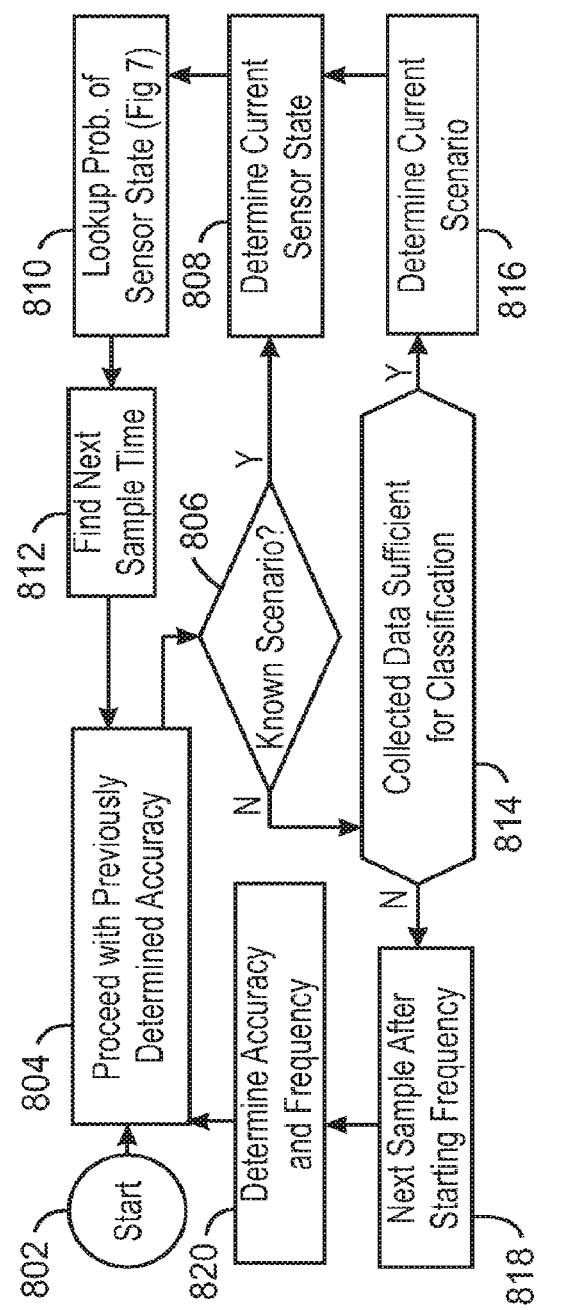
FIG. 8 is a block flow diagram of a method of determining sampling frequency in accordance with embodiments of the present techniques.

FIG. 8 is a method 800 of determining sampling frequency or duration. In general, FIG. 8 indicates how the strategies with FIGS. 5, 6, and 7 may be combined to obtain the dynamic adjustment of the sampling frequency. Based on the actual monitored accuracy of a device after choosing an initial sampling frequency, employing the scenario-independent approach in FIG. 5 or the scenario-dependent approach in FIGS. 6 and 7, the next time to sample backup or reference devices is determined. Backup" devices may be healthy sensors that are inactive. FIG. 8 describes a method of when to activate these "backup" sensors to determine the state of working sensors.

At block 802, the method starts. At block 804, the method proceeds with previously-determined accuracy of the sensor. At block 806, the method decides if the scenario is known. A known scenario generally is accuracy change with time of the sensor following a known trajectory. If the scenario is known, then at block 808 the method determines the current state of the sensor. At block 810, the method looks up the probability of the sensor state reduction such as with FIG. 7. At block 812, based on the sensor state and probability of reduction in the sensor health state, the method determines or finds the next sample time or frequency, such as discussed with respect to FIG. 7.

If the scenario is not a known scenario, the method at block 814 determines if the collected data is sufficient for classification of the sensor. If yes, the method determines the current scenario at block 816 and the method continues at block 808. If there is not sufficient data for classification as determined at block 814, the method implements the next sample after starting frequency, as indicated in block 818. At block 820, the method may then determine the accuracy and sampling frequency of the sensor. The method returns to block 804.

As alluded to above, a fourth general aspect may be to avoid or reduce stress on reference devices. Moreover, the third general aspect with respect to avoiding or reducing oversampling may extend to reference devices as well. However, because reference devices are typically not pressed into continuous operation as with active devices, the impact of environmental factors on the reference devices should generally be considerably smaller than that shown, for example, in FIG. 6 and FIG. 7.

The discussion now turns to example system architecture and to elaboration of features discussed above. Strategies may either employ expensive devices (e.g., over-designed, with large design margins), or to field-deploy multiple devices and replace devices that have high errors with new devices redundantly deployed. Devices with high margins are not always possible or cost effective, while deploying many devices and switching from those that lose accuracy to others can also drive up costs and complexity of provisioning.

In contrast, embodiments herein may achieve longer operational life such as with a single device in a team of devices. Analogous is redundant array of inexpensive disks (RAID) having relatively high MTBF. Certain embodiments do not mandate high reliability design. Instead, higher reliability may be obtained, for example, through dynamic adaptation. Some examples can deliver higher accuracy than with a single device alone even if the single device was designed for higher reliability. Such may due, for instance, to an implemented strategy of interpolation. Certain examples may be more cost effective because of fewer redundant low-cost components. Moreover, some example applications may be adaptive and autonomic and, therefore, reduce labor-costly repairs in some instances.

The multiple states of operation of a device and determining efficiently the state of operation for each device are discussed below in the context of architecture and workflow. Moreover, how operation of devices in partial states of health is combined effectively but economically to achieve healthy operation of the collective is further discussed.

Figure 9:
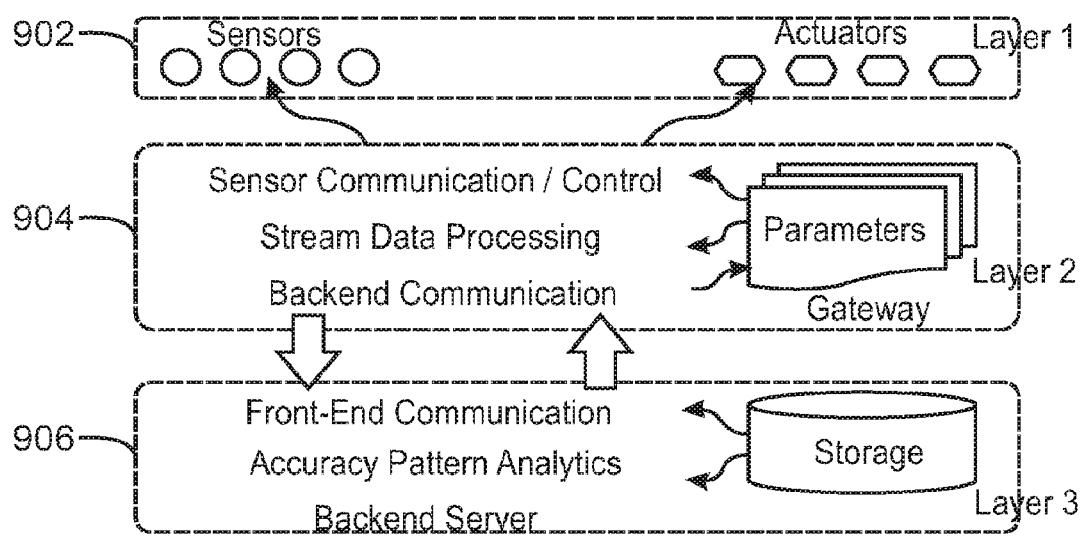
FIG. 9 is a diagram representation of architecture and workflow in accordance with embodiments of the present techniques.

FIG. 9 is a diagram 900 representation of architecture and workflow. In particular, the diagram 900 represents at least three layers of architecture. In other words, in the illustrated example, the architecture with components is organized into at least three logical layers: layer 1 (L1) 902, layer 2 (L2) 904, and layer 3 (L3) 906. Layer 1 (L1) 902 has sensors and actuators. Layer 2 (L2) 904 has gateway(s) and functions performed in gateways. Depicted functions are sensor communication and control, stream data processing, and back-end communication. Various parameters may be handled. Moreover, other functions are applicable. Layer 3 (L3) 906 has server(s) such as in data center and which may be rich in compute, storage, and network capacities. L3 906 may accommodate front-end communication, accuracy pattern analytics, a backend server, data storage, and so forth. Again, L1, L2, and L3 are logical layers. Thus, the L1 and L2 functions in some cases may be provided by the same device or may be by different physical devices. The functions may be implemented by code (e.g., instructions, logic, etc.) stored in memory and executed by a processor.

In some instances, sensor communication and control components or aspects in L2 may focus on sending control commands to sensors and receiving data from sensors. Yet, additional functions for L2 may include (1) sensor state management that determines when and which sensor should be active, and also (2) correcting data from sensor(s) if the sensors or data are too inaccurate. These two functions, and other functions, may be implemented by a L2 component. In one example, the component is named or labeled as a sensor manager or sensor state manager. In this example, the exemplary sensor state manager may be employed with respect to IoT and includes at least five sub-components, as discussed below with respect to FIG. 10.

Figure 10:
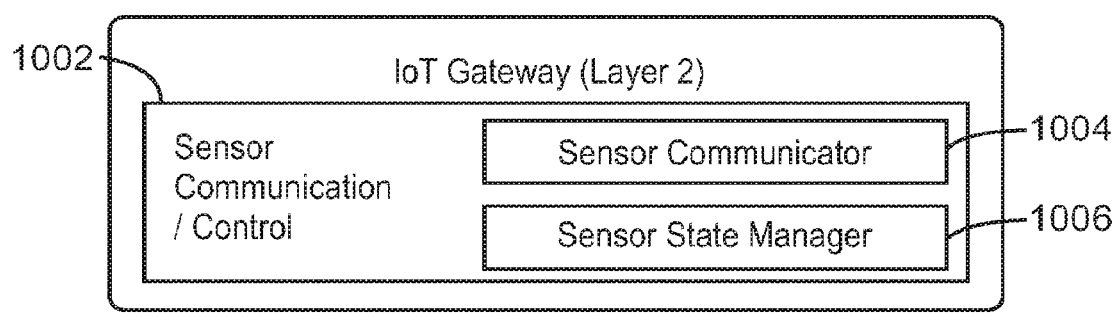
FIG. 10 is a diagram of a sensor state manager in accordance with embodiments of the present techniques.

FIG. 10 is a sensor state manager 1000 as an IoT gateway such as with L2 904 of FIG. 9. The sensor state manager 1000 may include code (e.g., instructions, logic, etc.) stored in memory and executable by a processor. For example, the sensor state manager 100 may include sensor communication/control code 1002 including a sensor communicator 1004 and a sensor state manager 1006. Thus, the sensor state manager may be incorporated into a sensor communication/control component of an IoT gateway layer (layer 2).

Figure 11:
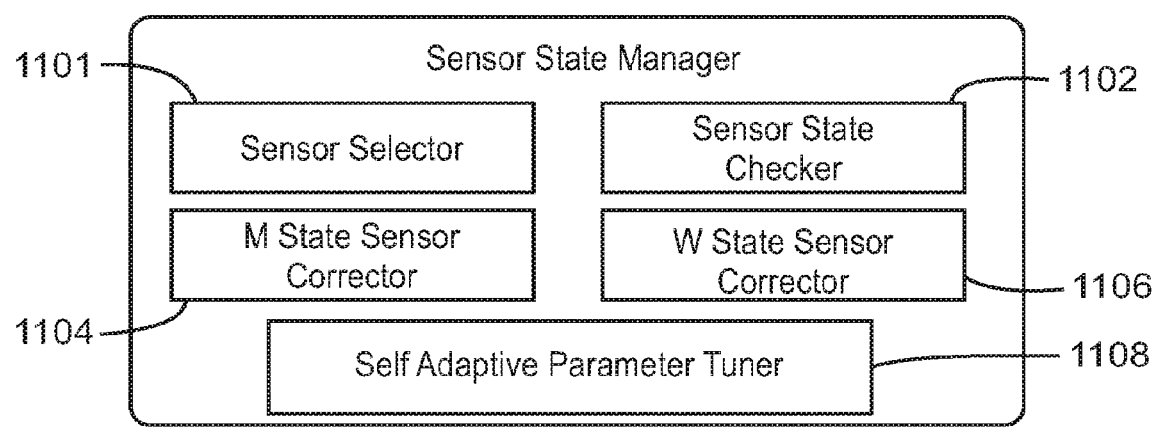
FIG. 11 is a diagram of a sensor state manager in accordance with embodiments of the present techniques.

FIG. 11 is a sensor state manager 1100 analogous to the sensor state manage 1000 of FIG. 10. The sensor state manager 1100 has certain sub-components which may be code stored in memory and executed by a processor, the code including a sensor selector 1101 and sensor state checker 1102. The sensor selector 1101 may select a sensor in H state, for example. The sensor state checker 1102 may determine where in a sensor operation trajectory the sensor is functioning. Such may include a dynamic technique to increase efficiency of state checking, as discussed below.

The code may also include an M-state sensor corrector 1104, a W-state sensor corrector 1106, and a self-adaptive parameter tuner 1108. The M-state sensor corrector 1104 may be responsible for dealing with the vulnerable range of operation of M-state sensors. The W-state sensor corrector 1106 may be responsible for dealing with the vulnerable range of operation of W-state sensors. The self-adaptive parameter tuner 1108 may dynamically tune parameters for detecting, correcting, and isolating inaccurate sensor data.

The discussion now considers the sensor state determination with regard to operation of components or subcomponents in FIG. 10 and FIG. 11. Also, as mentioned with respect to FIG. 4, a sensor state manager may control sensor states and use sensors to collect data. The following elaborates upon FIGS. 4, 10, and 11.

For some embodiments at the beginning, a sensor selector 1101 selects (e.g., block 404 in FIG. 4) a sensor in H state. The system may collect (e.g., block 408) data with this sensor. A sensor state checker 1102 may check the working sensor state in dynamic frequency. The state of sensor may be in either of H, M, W, U state. If the sensor is in H state, the sensor may be used to collect (e.g., block 408) data generally continually. If the sensor is in M state, the M state sensor corrector 1104 may correct the sensor and the sensor used to collect data again.

On the other hand, if the sensor is in W state, the W state sensor corrector 1106 may correct the sensor giving at least three potential results. First, if the sensor can be corrected into H state with other W state sensors, then these sensors will be grouped as 'H' state sensor, and this grouped sensor employed to collect data.

Second, if this sensor can be corrected into M state with other W state sensors, then these sensors may be grouped as a 'W' state sensor, and this grouped sensor may be corrected by the M state sensor corrector 1104 and then the sensor used to collect data. Third, if this sensor cannot be corrected together with other W state sensors, then this sensor will be added into W state sensor pool. The sensor selector 1101 will select another H state sensor to collect data.

Lastly, if this sensor is in U state, then this sensor will be marked and will typically not be used anymore. The sensor selector 1101 may then select another H state sensor to collect data.

Again, certain embodiments may be directed to efficient state transition including without oversampling. Ordinarily, the accuracy of the sensors may be determined periodically. For a device performing normally, frequent detection (e.g., sampling) can reduce operational life of the device. For example, as mentioned, frequently sampling air quality can cause more particulate deposits on an AQMD device as described above. Under-sampling can cause operating for longer periods without knowing the accuracy and reliability of a sensor. An objective, therefore, may be to sample infrequently yet identify transition of sensors from an operational state to a less accurate or less reliable operational state. In other words, the frequency may be dynamic.

Several example techniques may be implemented, including at least the five below. A first example technique varies sampling according to duration of deployment, including infrequently in the beginning, and increasing in frequency as deployment duration increases. The mean expected operational life for H, M, and W states may be determined ahead of time for a sensor. Sampling of the sensor generally rises from less (e.g., minimum) to more (e.g., maximum) as time in deployment for the sensor in a given state approaches or moves beyond the expected operation life in that state.

A second example incorporates the first example but with accelerated transition to increased or maximum sampling frequency when abnormal values are reported by a sensor. A third example incorporates the second example but with accelerated transition to increased or maximum sampling frequency in response to greater utilization of sensitive parts of the sensor (e.g., higher than average pollution detected by an air quality sampling device).

A fourth example involves determination of an accuracy trajectory in which a device of a specific type is characterized ahead of time. The fourth example determines a device accuracy trajectory based on current accuracy and operational life at that level of accuracy. That is, the values A'=A(S, t–t0, A)/t are determined through offline studies, where A' (e.g., %) is accuracy of next sampling, A is accuracy of current sampling, S is state of current sampling, t is time of current sampling, and t0 is initial start time of sampling. The values chart the instantaneous time-rate of loss of accuracy according to current state (S), the time spent in current state, and current level of accuracy. Based on A', f(A') can be defined as the dynamic sampling frequency, so that the sampling rate varies gradually from a minimum value to a maximum value according to how sharp the slope A' is at each point. A fifth example determine the sampling rate via the fourth example and considering the rate at which outlier values are reported by a sensor.

As indicated, a general aspect of the present techniques may relate to estimating impact of the environment. Indeed, the accuracy trend for a sensor is sometimes affected to a significant degree by the environment in which the sensor is deployed. Yet, the environmental impact on the sensor is not generally determinable in advance under controlled testing conditions in the laboratory. To resolve such, a real-time classification procedure or algorithm (e.g., that operates as shown in FIGS. 5, 6, 7, and 8) for sensors in operation may be employed. As shown in FIG. 5, a bootstrap sampling frequency for new sensors brought on line collect sufficient data in a back-end cluster to group IoT devices into different clusters. Initial sampling frequency can be obtained from offline studies.

Next, the environment may be parametrized as one of several coarse-grained scenarios S0, S1, . . . SN, where S1 degrades accuracy of a new, healthy sensor quicker than S0, S2 does so quicker than S1, and so on. Coarse grained may mean the scenario that a device finds itself in can be determined relatively easily such as without having to tease apart small effects, and generally independent of the accuracy of the device itself. For example, a scenario S2=high pollution may be determined by checking if smog levels detected by multiple IoT devices over a given area are above some threshold, regardless of the accuracy of individual sensors.

Referring back to FIG. 6, two scenarios (S0="good" and S1="bad") are represented by curves 606 and 608, respectively. The two curves 606 and 608 plot average degradation of accuracy for a sensor over time in the two scenarios, respectively, with that sensor starting in H state. In one example, the H state is defined as that in which accuracy >90%. FIG. 7 depicts the probability over time that the sensor continues to remain in H state. Accuracy in FIG. 6 may be measured by A=1–(Abs(W–B)/B), where W=measurement from a sensor, B=sampled measurement from one or more backup sensors, and Abs is absolute value.

Finally, FIG. 8 relying on examples, such as FIGS. 5, 6, and 7, obtains the dynamic adjustment of the sampling frequency. Based on the actual monitored accuracy of a device after choosing an initial sampling frequency, employing a scenario-independent approach as in FIG. 5 or a scenario-dependent approach as in FIGS. 6 and 7, the next time to sample backup devices is determined.

As for M state and W state sensor corrections discussed above, M or H state function may be achieved in some examples through collaboration among multiple W state devices, such as shown in FIG. 4. FIG. 8 illustrates a method 800 to determine whether and how to combine W state sensors to achieve operational equivalent of an H state. In one example, multiple sensors are detected to be in W state, and an H state sensor exists in an inactivated (passive) state. In this example, the H state sensor outputs over a defined time range be represented by the vector Y, and W1, W2, W3, . . . etc. denote the W state sensors. Over a given time range, outputs of the W state sensor may be represented, respectively, by column vectors W1, W2, W3, . . . and with W being the matrix [W1 W2 W3 . . . ]$^T$. Temporarily, in this example, the H state sensor is activated for a short duration to collect Y, and over the same or similar duration, the matrix of observations W is also collected. Using any appropriate machine learning method that is known to work well in a given domain, a minimum error estimation function $\phi$, $\phi(\underline{W})=\underline{Y}$ is determined. An example of $\phi$ is the linear least-squared estimator, $\phi(\underline{W})=a\underline{W}+b=\underline{Y}$, where a, b give least squared error in $\underline{Y}$.

The machine learning may be run on the collected data in a cluster. The cluster may be, for example, a computationally-rich datacenter or cloud backend. The min-error function $\phi$ may be an estimator, and with $\phi$ further improved or optimized to reduce or minimize the number of W state sensors whose outputs are significant in determining $\underline{Y}$ (and thus the remaining W state sensors can be deactivated).

Once the function and corresponding reduced or minimum set of active W state sensors is determined, these selected W state sensors can operate collectively as an H state sensor, provided that a low or minimum accuracy from $\phi$ meets or exceeds the desired accuracy. The estimation method can be repeated for determining which W state sensor, $\omega$, is actually in M state, by evaluating whether a sufficiently high accuracy estimation of Y' (where Y–Y' can be considered to be statistically insignificant in Y) can be obtained on the basis of readings obtained only from $\omega$.

Figure 12:
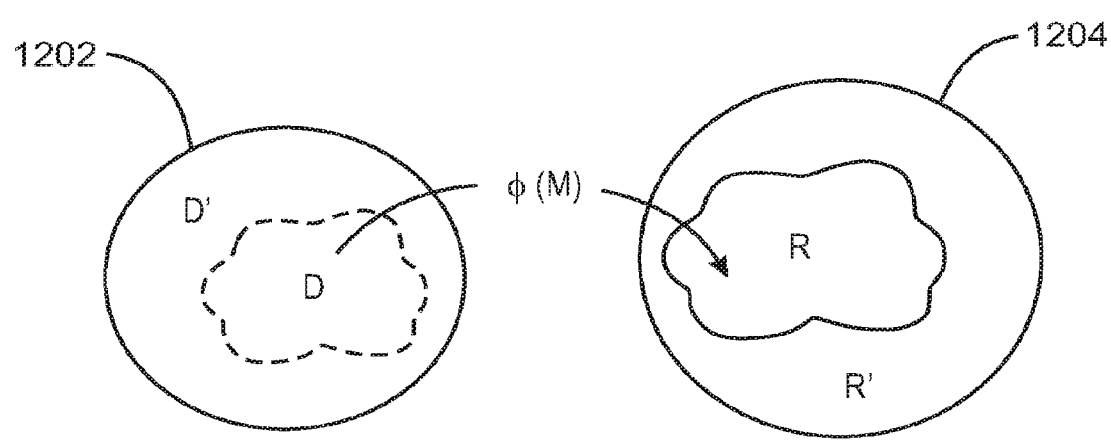
FIG. 12 is diagram representation of a subdomain and corrected values in accordance with embodiments of the present techniques.
Figure 13:
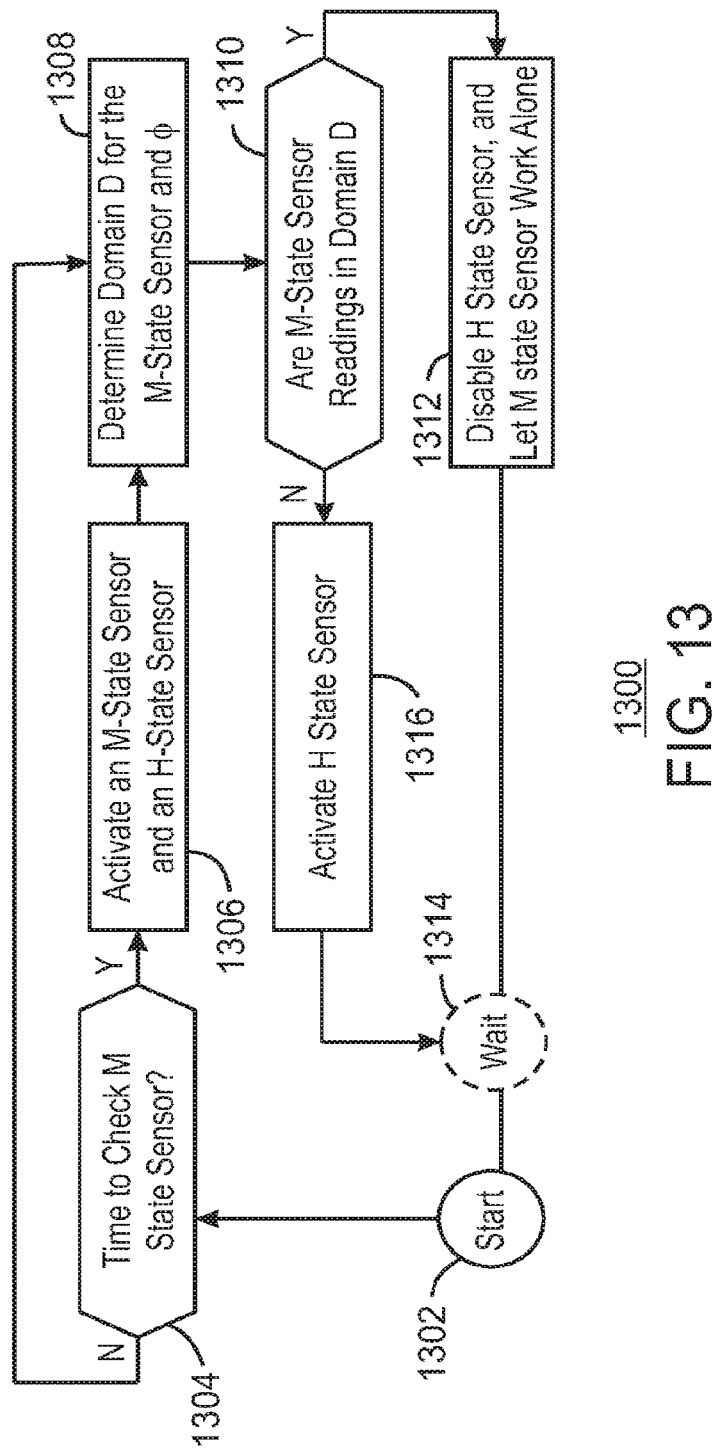
FIG. 13 is a block flow diagram of a method of dynamically tuning parameters in accordance with embodiments of the present techniques.

The discussion now turns to semi-autonomous (e.g., stand-alone) devices in M state. FIG. 12 and FIG. 13 indicate how one or more M state sensors can be used to reduce the duty cycle. In other words, reduce exposure of an H state sensor including for relatively long durations of time.

FIG. 12 is a diagram 1200 representation of sensor readings 1202 and corrected values 1204. The diagram 120 gives an M-state subdomain D and associated corrected values R. In other words, FIG. 12 indicates a subdomain D readings of an M-state sensor and the range R of corrected values. For the range of values over which an M state sensor is known to produce an accurate estimate of the real or true reading (e.g., using an applicable transformation), the domain D is generally known ahead of time. Thus, an example may detect that an M state sensor has produced a value that is not in D, and transition to an activation of an otherwise passive H state redundant sensor.

FIG. 13 is a method 1300 of dynamically tuning parameters, and for associating, for example, an M state sensor with an H state sensor to reduce exposure of the H state sensor. Indeed, FIG. 13 may be directed to semi-autonomous (e.g., stand-alone) devices in M state. At block 1302, the method starts. If at block 1304, it is time to check an M state sensor, the method at block 1306 activates an M state sensor and an H state sensor. At block 1308, the method determines a domain D for the M state sensor and an error function $\phi$ as discussed above. At block 1310, if there are M state sensor readings in domain D, the method at block 1312 disables the H state sensor, and the M-state sensor works alone in this example. On the other hand, if at block 1310 there are no M state sensor readings in domain D, the method at block 1316 keeps the H state sensor activated. In either case, at block 134, the method waits for changes in M state sensor readings in or out of the domain D to determine whether to keep the H state sensor activated or to deactivate the H state sensor to be passive.

Thus, in general, embodiments involve dynamically tuning parameters, such as for detecting, correcting, and isolating inaccurate sensors. Many parameters may facilitate control of how the state of a sensor is detected, and data correction applied as needed (including isolating data from a sensor in U state). For example, for an H state sensor, the system may detect state of the sensor periodically. Moreover, as discussed, H state can be separated into multiple sub-states, with different detection frequency per sub-state.

Therefore, the number of sub-states and detection frequencies for each may be parameters. Similarly, M and W states can be separated into multiple sub-states, and different frequencies employed to detect state/sub-state change. For each sub-state, correcting data can be parameterized as well, and with details varying according to solution domain. To isolate data from a U state sensor, one may choose to discard data immediately, log the data, or log a selection of the data. Most or all of these parameters can be predefined and stored in an IoT device. The parameters may also be updated dynamically from a back-end system. As IoT devices may be equipped with a communication module, a device may report its state/sub-state change pattern. Defining parameters and states in real time using analysis performed in a back-end system facilitates dynamic adjustments not just by sensor state but also by environmental conditions detected in that sensor's or sensor group's actual deployment.

Figure 14:
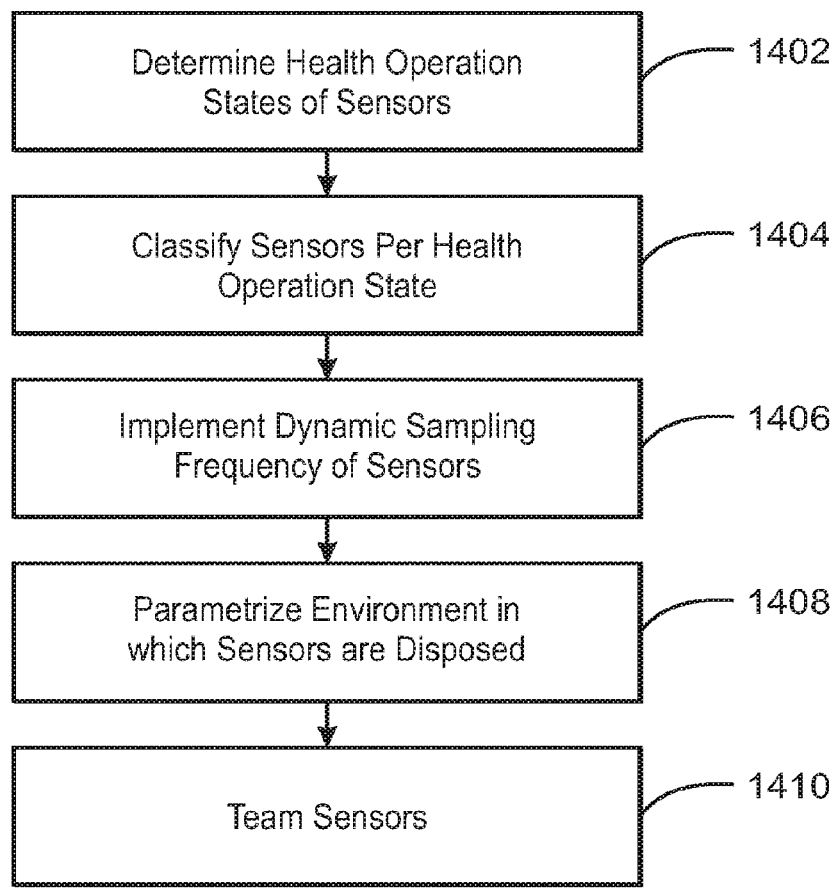
FIG. 14 is a block flow diagram of a method of sensor management in accordance with embodiments of the present techniques.

FIG. 14 is a method 1400 of managing sensors in a system by a computing device. To implement the method 1400, a sensor manager as code executed by a processor may be stored in memory of the computing device. In certain examples, the system includes or is an IoT system, and the sensors are IoT sensors. The computing device may be an IoT gateway device, a cloud computing device, or an IoT smart sensor, and the like.

At block 1402, the method determines the respective health operation state of the sensors. The health operation state may be correlative with sensor accuracy. The sensors may be sampled and the sampled data compared to a reference or reference sensor to determine accuracy of the sensors. The determination of health operation states may be an adaptive assessment of sensor health in which sampling frequency of a sensor is a function of accuracy drift of a sensor or of probability the sensor will remain in a current health operation state, or a combination thereof.

At block 1404, the method classifies (e.g., in real time) the sensors by their respective health operation state. In examples, the health operation states include a healthy (H) state, an unhealthy (U) state, and an intermediate state in which sensed data is less accurate than for the H state and more accurate as compared to the U state. In some examples, sensor data from an H state sensor is substantially accurate or at least 90% accurate. A 90% accuracy may mean that the sensor is accurate 90% of the time, or over 90% of the range in which the sensor measures, and so forth. In examples, sensor data from a U state sensor data is unacceptable or unusable. The data from a U state sensor may be isolated.

In some examples, there are multiple intermediate states such as a moderately healthy (M) state and a weak healthy (W) state. For an M state sensor, some sensed data is accurate and other sensed data is inaccurate, or sensed data deviation from accurate follows a pattern, an so on. In examples, a W state sensor cannot be used alone.

At block 1406, the method implements a dynamic sampling frequency of the sensors to determine the health of health operation state of the sensors. Initially, for example, a bootstrap sampling frequency is implemented for new sensors brought on line. Also, the method may implement an increasing sampling frequency of a sensor correlative with increasing deployment duration of the sensor. Further, the method may accelerate increasing sampling frequency in response to the sensor reporting abnormal values, or in response to greater utilization of a sensitive part of the sensor, and so on.

At block 1408, the method the determination of health operation states and associated classification of the sensors includes parametrizing the environment in which the sensors are disposed. In particular examples, the environment is parametrized as scenarios. In any case, drift of sensor accuracy may follow a pattern that is decipherable as a function of environmental and usage factors. The increasing loss of accuracy or health may be cumulatively over time and variable due to different levels of usage and environmental stresses, pollution, etc. Moreover, a device with less than normal operation in one set of conditions can deliver acceptable usage over other sets of conditions. Associated policies may govern whether the current external factors indicate a device to be treated as in H, M, W, or U mode (or others, depending on how many categories of operation are defined.

At block 1410, the method includes teaming sensors. For example, the method includes teaming two sensors each having the intermediate state to give a team having the H state. In another example, the method includes treating a grouping of multiple W state sensors as a single logical sensor in H state or M state.

In yet another example, the method includes associating or teaming an M state sensor with an H state sensor to reduce exposure of the H state sensor. The method includes determining a domain for which the M state sensor is substantially accurate. The method then deactivates the H state sensor in response to the M state sensor readings occurring in the domain. The method activates the H state sensor in response to the M state sensor readings occurring outside of the domain.

Figure 15:
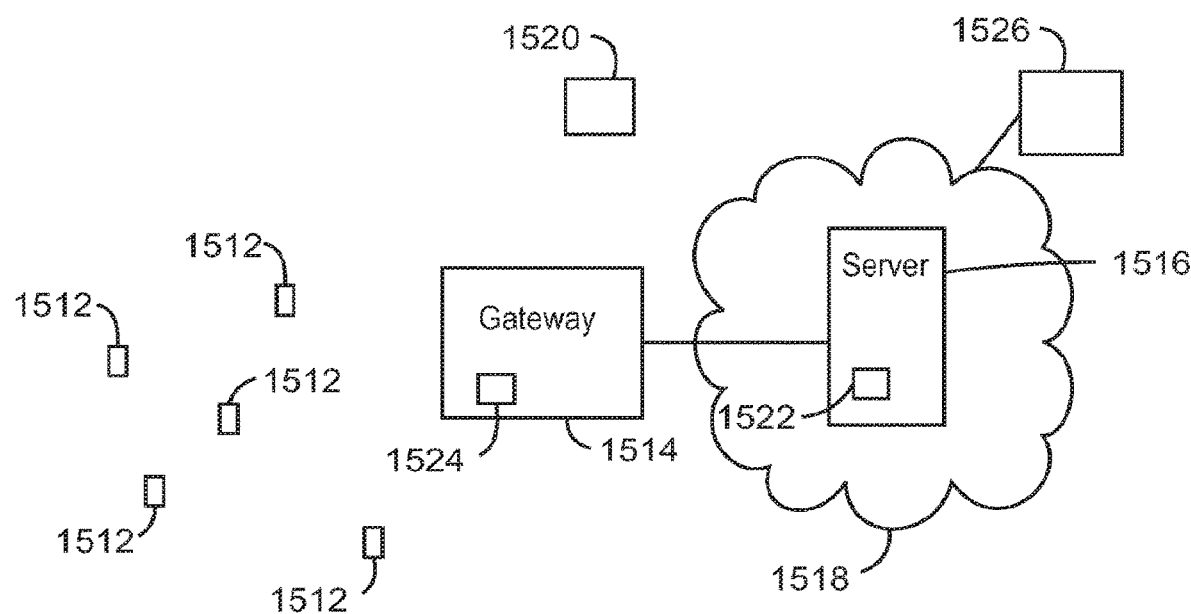
FIG. 15 is a drawing of a system employing multiple sensors in accordance with embodiments of the present techniques.

FIG. 15 is a system 1510 employing multiple sensors 1512. The sensors 1512 may detect or measure physical characteristic or features of an object, an environmental parameter or characteristic, and so on. In the illustrated example, the sensors 1512 measure the characteristic and send the measured data to one or more gateway devices 1514. The sensors 1512 may be smart sensors, IoT sensors, and the like. The sensors 1512 may be wirelessly and/or wired coupled to the gateway device(s) 1514. The gateway device 1514 may aggregate the data and send the data to a remote computing device such as a server 1516 in a cloud infrastructure 1518. The server 1516 may be a cloud computing device or cloud distributed computing system, and the like. The system 1510 may be an IoT system and may include actuators (not shown) dispersed among the sensors 1512.

The sensors 1512 may be sampled for accuracy with the sampled data compared to readings of a reference device or reference sensor. One or more of the sensors 1512 may be a reference device or reference sensor. Also, the system 1510 may include or have access to a reference sensor 1520.

A computing system such as the server 506 and/or the gateway device 504 manage the sensors 1512, as discussed above. For example, the sensor management may involve determining the respective health operation state of the sensors 1512, considering the environment of the sensors 1512, varying sampling frequency of the sensors 1512, teaming some of the sensors 1512, and the like. The server 506 and/or the gateway device 504 may include executable code 512 and code 514, respectfully, store in memory for such sensor management. Lastly, the cloud 1518 may be in communication with other systems 1526.

As for sensors in general, sensors may produce a measurable signal in response to a stimulus. A sensor may include or be associated with a transducer device that converts one form of energy into another form of energy. A transducer may be a device that converts a signal from one physical form to a corresponding signal having a different physical form which may be mechanical, thermal, magnetic, electric, optical, chemical, and so on. A sensor may be an input transducer (e.g., microphone) and an actuator may be an output transducer (e.g., loudspeaker). A sensor may be a device that receives and responds to a signal or stimulus. In general, with a sensor, a sensing or sensitive layer or medium responds to the external stimulus and the transducer may convert the response into an external measurable quantity. A sensor may be or include a detector that indicate presence of a parameter or object. In operation, a sensor may monitor and quantify changes in the measured parameter or object.

Features or characteristics of sensors may be static or dynamic, and these sensor parameters may map output versus input. Sensor characteristics may include accuracy, error, precision, resolution, sensitivity, selectivity, noise, drift, detection limit, repeatability, reproducibility, hysteresis, stability, response time, range or span, offset, and so forth. Accuracy of a sensor may be how correctly the sensor output represents the true value, how well the sensor measures the environment in an absolute sense, and/or how good the sensor measured data compared with a recognized standard, and the like. Drift may be a gradual change in the sensor's response while the measured object or parameter remains the same. In some examples, dynamic characteristics of sensors may be determined by analyzing the response of a sensor to a family of variable input waveforms (e.g., impulse, step, ramp, sinusoidal, white noise, etc.). Mathematical representations for sensors or sensing systems may be linear, nonlinear, time invariant, time dependent, and so on. An output characteristic curve versus input of physical parameter may give detectable output changes for the sensors. In general, for some examples, a sensor response may be an output change versus an input parameter change.

Figure 15A:
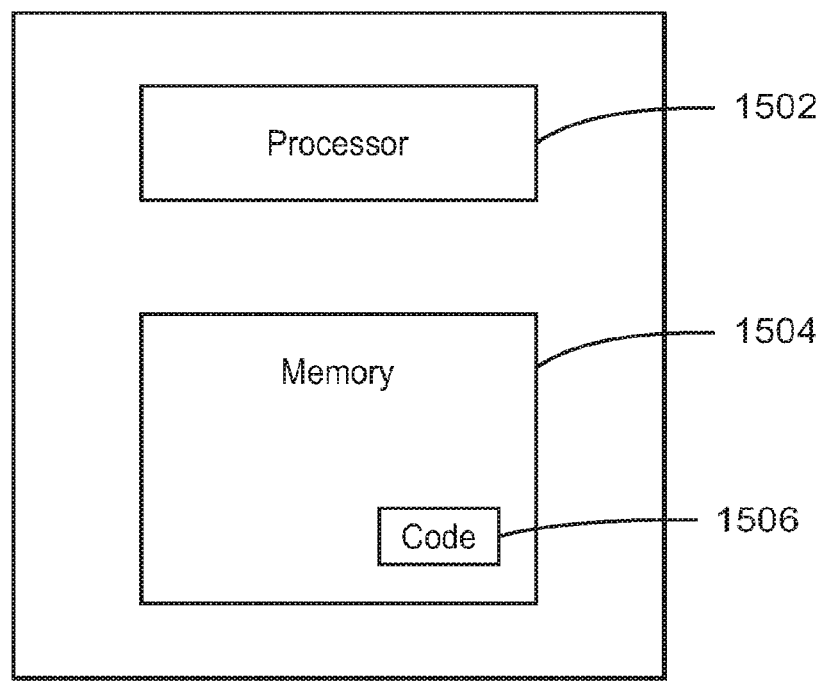
FIG. 15A is a drawing of a computing device for sensor management in accordance with embodiments of the present techniques.

FIG. 15A is a computing device 1500, such as a computing system, cloud computing system, gateway device, sensor device, server, aggregation device, remote computer, fog device, and the like. While FIG. 15A depicts one computing device 1500, embodiments may employ multiple computing devices 1500 and/or be a distributed computing system. The computing device 1500 includes a processor or hardware processor 1502 such as a microprocessor, a central processing unit or CPU, and so forth. The processor 1502 may be multiple processors or each processor 1502 may have multiple cores. The computing device 1500 has memory 1504, such as non-volatile memory, volatile memory, and other types of memory. The nonvolatile memory may be a hard drive, read-only-memory or ROM, etc. The volatile memory may be random access memory or RAM, cache, etc.

In the illustrated example, the memory 1504 stores code 1506, e.g., instructions, logic, etc., executable by the one or more processors 1502. The code 1506 may be a sensor manager to manage sensors in a system. Indeed, the code 1504 may be executed by the processor 1504 to implement the sensor management techniques discussed herein. As discussed, the sensor management may involve determining the respective health operation state of the sensors, considering the environment of the sensors, varying sampling frequency of the sensors, teaming some of the sensors, and so on. Further, respective actions may be implemented by different computing devices 1500. Also, the computing device 1500 may include an application-specific integrated circuit (ASIC) customized for the techniques described.

Figure 16:
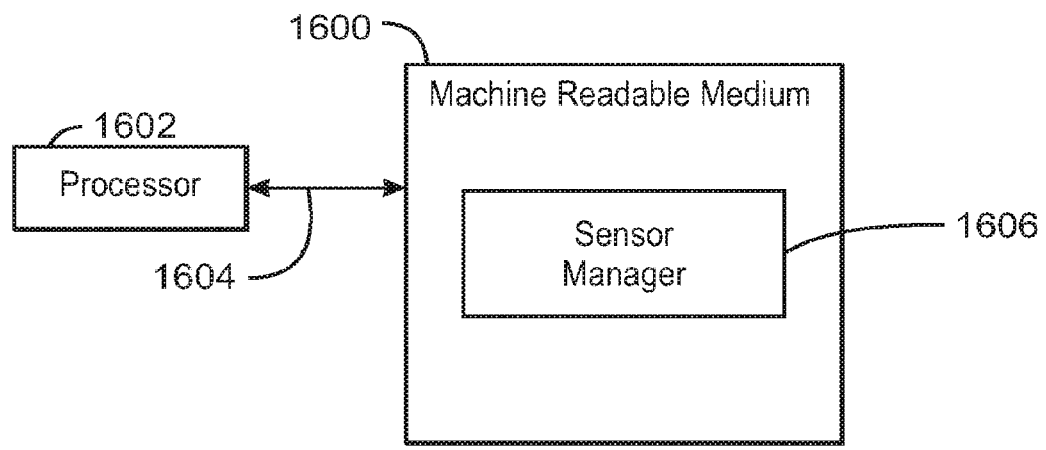
FIG. 16 is a block diagram illustrating a computer-readable medium to facilitate sensor management in accordance with embodiments of the present techniques.

FIG. 16 is a block diagram depicting a tangible, non-transitory, computer-readable medium 1600 to facilitate sensor management. The computer-readable medium 1600 may be accessed by a processor 1602 over a computer interconnect 1604. The processor 1602 may be an aggregation device processor, a sensor processor, a server processor, a remote computing device processor, a cloud computing system processor, or other processor. The tangible, non-transitory, computer-readable medium 1600 may include executable instructions or code to direct the 1602 to perform the techniques described herein, such as to implement the discussed sensor management.

The various software components discussed herein may be stored on the tangible, non-transitory, computer-readable medium 1600, as indicated in FIG. 16. For example, a sensor management module 1606 (executable code/instructions) may direct the processor 1602 to implement management of sensor devices in a system including in an IoT system or network. The sensor management may involve determining the respective health operation state of the sensors, considering the environment of the sensors, varying sampling frequency of the sensors, teaming some of the sensors, and so forth. It should be understood that any number of additional software components not shown in FIG. 16 may be included within the tangible, non-transitory, computer-readable medium 1600, depending on the application.

In general, devices will be increasingly integrated by billions into IoT networks as very large scale grids of intercommunicating, autonomous sensors, actuators, and intelligent edge processing nodes. Benefits may be realized from simplifying the deployment of these devices and removing the cost of making their operations reliable. As edge gateways become more sophisticated and more power efficient, the invention described here paves the way for more autonomous reconfigurations among these devices for very long duration operations. One can for example, target IoT clusters in the millions in space exploration, where manual repairs are mostly unviable and where the exposure to particle bombardments on sensitive surfaces means that even high margin devices would require adaptive redundancy for their operation.

The internet of things (IoT) includes a paradigm in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, factory automation, smart building, asset tracking/logistics, Operation Technology (OT) with industrial/factory networks, and the like. The IoT devices may be accessible through remote computers, servers, and other systems, for example, to control systems or access data.

The future growth of the Internet may include very large numbers of IoT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 1 and 2.

Figure 17:
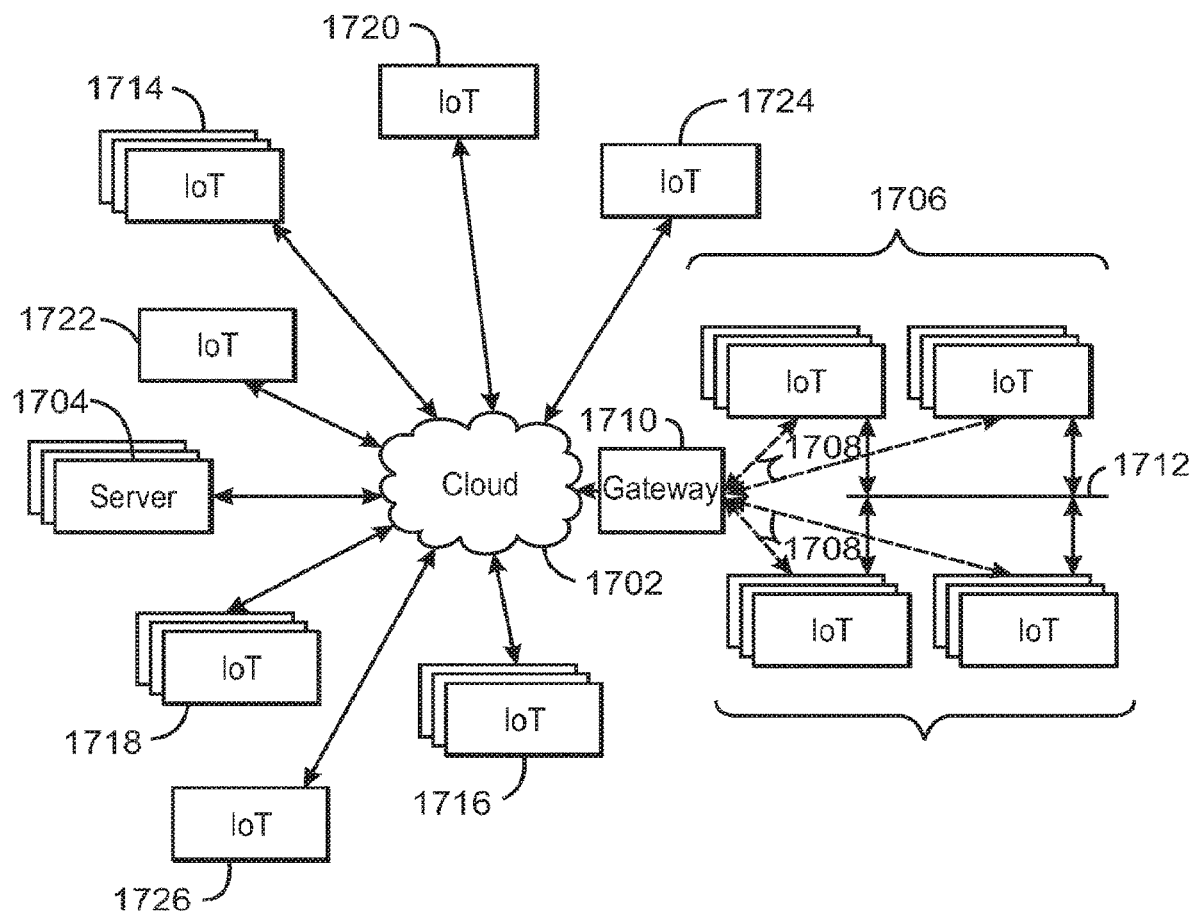
FIG. 17 is a drawing of a cloud computing network, or cloud, in communication with a number of IoT devices in accordance with embodiments of the present techniques.

FIG. 17 is a drawing of a cloud computing network, or cloud 1702, in communication with a number of Internet of Things (IoT) devices. The cloud 1702 may represent the Internet, or may be a local area network (LAN), or a wide area network (WAN), such as a proprietary network for a company. The cloud 1702 may be in contact with one or more servers 1704 that may provide command and control functions or consume data from the IoT devices. The IoT devices may include any number of different types of devices, grouped in various combinations. For example, a traffic control group 1706 may include IoT devices along streets in a city. These IoT devices may include stoplights, traffic flow monitors, cameras, weather sensors, and the like. The traffic control group 1706, or other subgroups, may be in communication with the cloud 1702 through wireless links 1708, such as low power wide area (LPWA) links, and the like. Further, a wired or wireless sub-network 1712 may allow the IoT devices to communicate with each other, such as a local area network, wireless local area network, and the like. The IoT devices may use another device, such as a gateway 1710, which may function as an aggregator or aggregation device, to communicate with the cloud 1702.

Other groups of IoT devices may include temperature sensors 1714, remote weather stations 1716, alarm systems 1718, automated teller machines 1720, alarm panels 1722, or moving vehicles, such as emergency vehicles 1724 or drones 1726, among many others. Each of these IoT devices may be in communication with other IoT devices, with servers 1704, or both.

As can be seen from FIG. 17, a large number of IoT devices may be communicating through the cloud 1702. This may allow different IoT devices to request or provide information to other devices autonomously. For example, the traffic control group 1706 may request a current weather forecast from a group of remote weather stations 1716, which may provide the forecast without human intervention. Further, an emergency vehicle 1724 may be alerted by an automated teller machine 1720 that a burglary is in progress. As the emergency vehicle 1724 proceeds towards the automated teller machine 1720, it may access the traffic control group 1706 to request clearance to the location, for example, by turning traffic lights to red to block cross traffic at an intersection in sufficient time for the emergency vehicle 1724 to have unimpeded access to the intersection.

Clusters of IoT devices, such as the remote weather stations 1716 or the traffic control group 1706, may be equipped to communicate with other IoT devices as well as with the cloud 1702. This may allow the IoT devices to form an ad-hoc network between the devices, allowing them to function as a single device, which may be termed a fog device discussed further with respect to FIG. 2.

Figure 18:
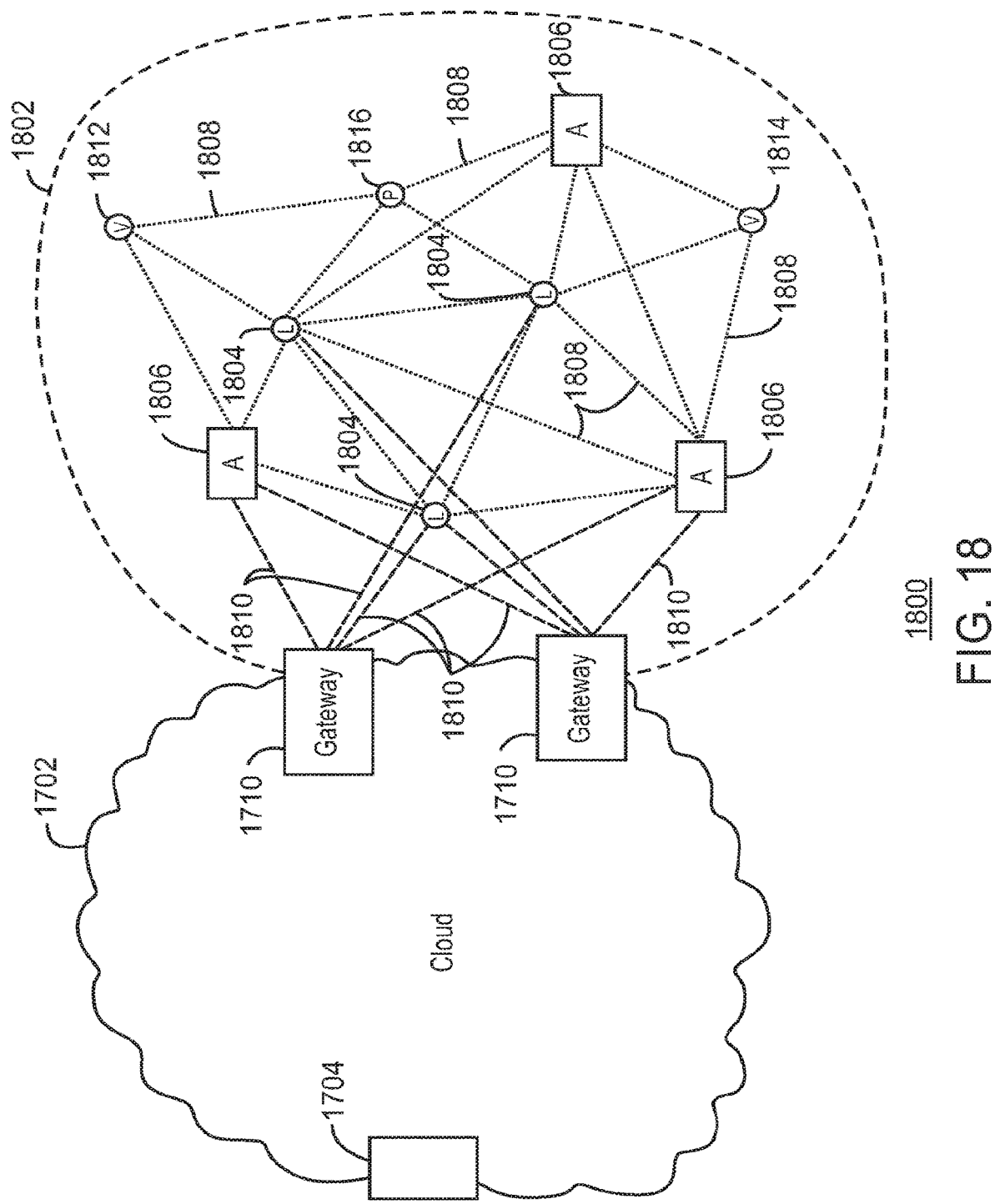
FIG. 18 is a drawing of a cloud computing network, or cloud, in communication with a mesh network of IoT devices, which may be termed a fog device, operating at the edge of the cloud in accordance with embodiments of the present techniques.

FIG. 18 is a drawing 1800 of a cloud computing network, or cloud 1702, in communication with a mesh network of IoT devices, which may be termed a fog device 1802, operating at the edge of the cloud 1702. Like numbered items are as described with respect to FIG. 17. In this example, the fog device 1802 is a group of IoT devices at a street intersection. The fog device 1802 may be established in accordance with specifications released by the OpenFog Consortium (OFC), among others. These specifications allow the formation of a hierarchy of computing elements between the gateways 1710 coupling the fog device 1802 to the cloud 702 and endpoint devices, such as the traffic lights 1804 and the data aggregators 1806 in this example.

Traffic flow through the intersection may be controlled by three traffic lights 1804 in this example. Analysis of the traffic flow and control schemes may be implemented by aggregators 1806 that are in communication with the traffic lights 1804 and each other through a mesh network. Data may be uploaded to the cloud 1702, and commands may be received from the cloud 1702, through gateways 1710 that are in communication with the traffic lights 1804 and the aggregators 1806 through the mesh network.

Any number of communications links may be used in the fog device 1802. Shorter-range links 1808, for example, compatible with IEEE 802.15.4 may provide local communications between IoT devices that are proximate to the intersection. Longer-range links 1810, for example, compatible with LPWA standards, may provide communications between the IoT devices and the gateways 1710. To simplify the diagram, not every communications link 1808 or 1810 is labeled with a reference number.

The fog device 1802 may be considered to be a massively interconnected network wherein a number of IoT devices are in communications with each other, for example, by the communication links 1808 and 1810. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, routing protocol for low-power (RPL), the optimized link state routing (OLSR) protocol, or the better approach to mobile ad-hoc networking (B.A.T.M.A.N.), among many others.

Communications from any IoT device may be passed along the most convenient path between any of the IoT devices to reach the gateways 1710. In these networks, the number of interconnections provide substantial redundancy, facilitating communications to be maintained, even with the loss of a number of IoT devices.

Not all of the IoT devices may be permanent members of the fog device 1802. In the example in the drawing 1800, three transient IoT devices have joined the fog device 1802, a first vehicle 1812, a second vehicle 1814, and a pedestrian 1816. In these cases, the IoT device may be built into the vehicles 1812 and 1814, or may be an App on a cell phone carried by the pedestrian 1816.

The fog device 1802 of the devices may be presented to clients in the cloud 1702, such as the server 1704, as a single device located at the edge of the cloud 1702. In this example, the control communications to specific resources in the fog device 1802 may occur without identifying any specific IoT device within the fog device 1802. Accordingly, if an IoT device fails, other IoT devices may be able to discover and control a resource. For example, the traffic lights 1804 may be wired so as to allow any one of the traffic lights 1804 to control lights for the other traffic lights 1804.

In some examples, the IoT devices may be configured using an imperative programming style, e.g., with each IoT device having a specific function and communication partners. However, the IoT devices forming the fog device 1802 may be configured in a declarative programming style, allowing the IoT devices to reconfigure their operations and communications, such as to determine needed resources in response to conditions, queries, and device failures. This may be performed as transient IoT devices, such as the pedestrian 1816, join the fog device 1802. As the pedestrian 1816 is likely to travel more slowly than the vehicles 1812 and 1814, the fog device 1802 may reconfigure itself to ensure that the pedestrian 1816 has sufficient time to make it through the intersection. This may be performed by forming a temporary group of the vehicles 1812 and 1814 and the pedestrian 1816 to control the traffic lights 1804. If one or both of the vehicles 1812 or 1814 are autonomous, the temporary group may instruct the vehicles to slow down prior to the traffic lights 1804.

As the transient devices 1812, 1814, and 1816, leave the vicinity of the intersection the fog device 1802, it may reconfigure itself to eliminate those IoT devices from the network. As other transient IoT devices approach the intersection, the fog device 1802 may reconfigure itself to include those devices.

The fog device 1802 may include the traffic lights 1804 for a number of intersections, such as along a street, along with all of the transient IoT devices along the street. The fog device 1802 may then divide itself into functional units, such as the traffic lights 1804 and other IoT devices proximate to a single intersection. This type of combination may enable the formation of larger IoT constructs in the fog device 1802. For example, if an emergency vehicle joins the fog device 1802, an emergency construct, or virtual device, may be created that includes all of the traffic lights 1804 for the street, allowing control of the traffic flow patterns for the entire street. The emergency construct may instruct the traffic lights 1804 along the street to stay red for opposing traffic and green for the emergency vehicle, expediting the passage of the emergency vehicle. Lastly, many other similar and different configurations and applications unrelated to vehicular traffic are relevant and applicable.

Figure 19:
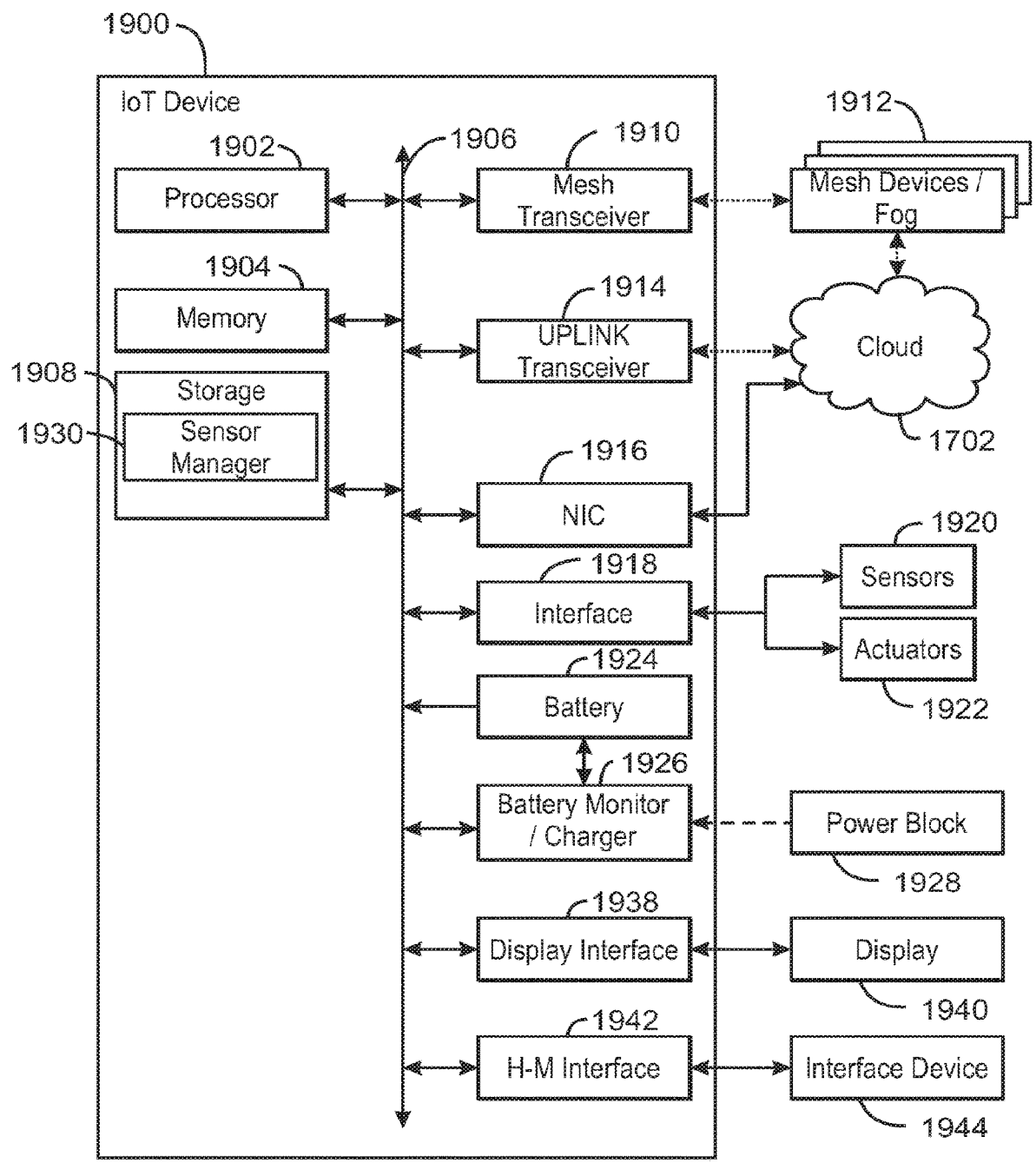
FIG. 19 is a drawing of a computing device in accordance with embodiments of the present techniques.

FIG. 19 is a block diagram of an example of components that may be present in an IoT device 900 for managing sensors in an IoT system. The IoT device 1900 may include any combinations of the components shown in the example. The components may be implemented as ICs, portions thereof, discrete electronic devices, or other modules, logic, hardware, software, firmware, or a combination thereof adapted in the IoT device 1900, or as components otherwise incorporated within a chassis of a larger system. The block diagram of FIG. 19 is intended to show a high-level view of components of the IoT device 1900. However, some of the components shown may be omitted, additional components may be present, and different arrangements of the components shown may occur in other implementations.

The IoT device 1900 may include a processor 1902, which may be a microprocessor, a multi-core processor, a multithreaded processor, an ultra-low voltage processor, an embedded processor, or other known processing element. The processor 1902 may be a part of a system on a chip (SoC) in which the processor 1902 and other components are formed into a single integrated circuit, or a single package, such as the Edison™ or Galileo™ SoC boards from Intel. As an example, the processor 1902 may include an Intel® Architecture Core™ based processor, such as a Quark™, an Atom™, an i3, an i5, an i7, or an MCU-class processor, or another such processor available from Intel® Corporation, Santa Clara, Calif. However, any number of other processors may be used, such as those available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 1902 may communicate with a system memory 1904 over a bus 906. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 908 may also couple to the processor 1902 via the bus 1906. To enable a thinner and lighter system design, the mass storage 1908 may be implemented via a solid state disk drive (SSDD). Other devices that may be used for the mass storage 1908 include flash memory cards, such as SD cards, microSD cards, xD picture cards, and the like, and USB flash drives. In low power implementations, the mass storage 1908 may be on-die memory or registers associated with the processor 1902. However, in some examples, the mass storage 1908 may be implemented using a micro hard disk drive (HDD). Further, any number of new technologies may be used for the mass storage 908 in addition to, or instead of, the technologies described, such as resistance change memories, phase change memories, holographic memories, or chemical memories, among others. For example, the IoT device 1900 may incorporate the 3D XPOINT memories from Intel® and Micron®.

The components may communicate over the bus 1906. The bus 1906 may include any number of technologies, including industry standard architecture (ISA), extended ISA (EISA), peripheral component interconnect (PCI), peripheral component interconnect extended (PCIx), PCI express (PCIe), or any number of other technologies. The bus 1906 may be a proprietary bus, for example, used in a SoC based system. Other bus systems may be included, such as an I2C interface, an SPI interface, point to point interfaces, and a power bus, among others.

The bus 1906 may couple the processor 1902 to a mesh transceiver 1910, for communications with other mesh devices 1912. The mesh transceiver 1910 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1912. For example, a WLAN unit may be used to implement WiFi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 1910 may communicate using multiple standards or radios for communications at different ranges. For example, the IoT device 1900 may communicate with close devices, e.g., within about 10 meters, using a local transceiver based on BLE, or another low power radio, to save power. More distant mesh devices 1912, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 1910 may be incorporated into an MCU as an address directly accessible by the chip, such as in the Curie® units available from Intel.

An uplink transceiver 1914 may be included to communicate with devices in the cloud 102. The uplink transceiver 1914 may be LPWA transceiver that follows the IEEE 802.15.4, or IEEE 802.15.4g standards, among others. The IoT device 1900 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in IEEE 802.15.4e may be used.

Any number of other radio communications and protocols may be used in addition to the systems mentioned for the mesh transceiver 1910 and uplink transceiver 1914, as described herein. For example, the radio transceivers 1910 and 1912 may include an LTE or other cellular transceiver that uses spread spectrum (SPA/SAS) communications for implementing high speed communications, such as for video transfers. Further, any number of other protocols may be used, such as Wi-Fi networks for medium speed communications, such as still pictures, sensor readings, and provision of network communications.

The radio transceivers 1910 and 1914 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). Cellular standards such as LTE-machine-type communication (LTE-M), LTE-narrowband (LTE-NB), or variations thereof, may be applicable. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 1914, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1916 may be included to provide a wired communication to the cloud 1702. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1916 may be included to allow connection to a second network, for example, a NIC 1916 providing communications to the cloud over Ethernet, and a second NIC 1916 providing communications to other devices over another type of network.

With respect to representation of NIC, uplink, and mesh transceiver, in the general case for QW node there may be at least two physical interfaces. One interface for the low power mesh (e.g. IEEE 802.15.46) which may have mesh and routing capability as part of the stack. A second physical interface may have internet protocol (IP) connectivity that performs the "uplink" reporting of data to a cloud entity.

The bus 906 may couple the processor 1902 to an interface 1918 that may be used to connect external devices. The external devices may include sensors 1920, such as accelerometers, level sensors, flow sensors, temperature sensors, pressure sensors, barometric pressure sensors, and the like. The interface 1918 may be used to connect the IoT device 900 to actuators 1922, such as power switches, valve actuators, an audible sound generator, a visual warning device, and the like.

While not shown, various input/output (I/O) devices may be present within, or connected to, the IoT device 1900. For example, a display may be included to show information, such as sensor readings or actuator position. An input device, such as a touch screen or keypad may be included to accept input.

Indeed, the IoT device 1900 may have one or more I/O interfaces, such as a display interface 1938 and a human-machine (HM) interface 1942. The display interface 1938 may accommodate video, as well as audio. In the illustrated example, a display 1940 may be coupled to the display interface 1938. The display 1940 may provide for display of data including IoT data collected via IoT systems. The display 1940 may incorporate technologies such as liquid crystal display (LCD), light emitting diodes (LED), organic LED (OLED), gas-plasma, and so forth. The display 1940 can be a simple display or a more complex display. The display 1940 may be an interactive display and accommodate user input. In some examples, the display 1940 may have a touch screen for user input. The display 1940 may have knobs or push buttons, and be configured with virtual icons, selectable or multi-touch menus, a graphical user interface (GUI), and so forth.

An interface device 1944 may be coupled to the HM interface 1942 (HMI). The interface device 1944 may include a touchscreen, mouse, keyboards, buttons, and the like. The HM interface 1942 may include a hardware and code to accommodate human interaction and input. Moreover, while the display 1940 and the interface device 1944 are depicted as coupled to or part of the IoT device 1900, various nodes and devices throughout IoT systems can be coupled to or associated with a display device or interface device for the display of IoT data and for human interaction.

A battery 1924 may power the IoT device 1900, although in examples in which the IoT device 1900 is mounted in a fixed location, it may have a power supply coupled to an electrical grid. The battery 1924 may be a lithium ion battery, a metal-air battery, such as a zinc-air battery, an aluminum-air battery, a lithium-air battery, and the like.

A battery monitor/charger 1926 may be included in the IoT device 1900 to track the state of charge (SoCh) of the battery 1924. The battery monitor/charger 1926 may be used to monitor other parameters of the battery 1924 to provide failure predictions, such as the state of health (SoH) and the state of function (SoF) of the battery 1924. The battery monitor/charger 1926 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1926 may communicate the information on the battery 1924 to the processor 1902 over the bus 1906. The battery monitor/charger 1926 may also include an analog-to-digital (ADC) convertor that allows the processor 1902 to directly monitor the voltage of the battery 1924 or the current flow from the battery 1924. The battery parameters may be used to determine actions that the IoT device 1900 may perform, such as transmission frequency, mesh network operation, sensing frequency, and the like. This may be related back to the failure operations being performed discussed above.

A power block 1928, or other power supply coupled to a grid, may be coupled with the battery monitor/charger 1926 to charge the battery 1924. In some examples, the power block 1928 may be replaced with a wireless power receiver to obtain the power wirelessly, for example, through a loop antenna in the IoT device 1900. A wireless battery charging circuit, such as an LTC4020 chip from Linear Technologies of Milpitas, Calif., among others, may be included in the battery monitor/charger 1926. The specific charging circuits chosen depend on the size of the battery 1924, and thus, the current required. The charging may be performed using the Airfuel standard promulgated by the Airfuel Alliance, the Qi wireless charging standard promulgated by the Wireless Power Consortium, the Rezence charging standard, promulgated by the Alliance for Wireless Power, among others.

The mass storage 1908 may include a number of modules to implement the sensor described herein. For example, block 1930 may be executable code to implement the sensor management. The sensor management may involve determining the respective health operation state of the sensors, considering the environment of the sensors, varying sampling frequency of the sensors, teaming some of the sensors, and so forth.

While redundant sensors are employed, an aspect may be to have less redundant sensors than typical by continuing to use degraded sensors of an intermediate health level by teaming. Certain embodiments of the sensor manager 1930 may address anticipation (e.g., dynamic anticipation) of sensor degradation and failure, and with the applicability of pairing or teaming a degraded sensor with another sensor or a redundant sensor. This is applicable in the context of vital sensor functions and edge devices or fog elements. For instance, with or in a local edge device or fog device configuration (e.g., see FIGS. 15-19), redundancy for vital measurements for replacement or teaming in the networked devices may be implemented when a normal or vital sensor function shifts into the intermediate health level. This redundancy and teaming may be a function of the thresholds and other factors previously discussed. Again, such may be implemented with respect to fog networking elements.

Lastly, although shown as code block 1930 in the mass storage 1908, it may be understood that the sensor manager module may be replaced with hardwired circuits, for example, built into an application specific integrated circuit (ASIC). The mass storage 1908 may further include and store other functional blocks, such as a control UI for accessing configuration parameters, and an automation framework that may provide application program interfaces (APIs) for the interaction of canned trigger scripts. Other functional blocks that may be present include accelerated processing units (APUs) in the automation framework that exchange a standard set of timing information that allows trigger scripts to identify synchronous versus staggered starts. An IoT database may be includes to store workflow configuration information, observed system performance, and resulting solution characteristics. Interactions with the IoT database may be via the control UI.

In the description and claims, the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit or receive signals, among others.

An embodiment is an implementation or example. Reference in the specification to "an embodiment", "one embodiment", "some embodiments", "various embodiments", or "other embodiments" means that a particular feature, structure, or characteristic described in connection with the embodiments is included in at least some embodiments, but not necessarily all embodiments, of the present techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can", or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement or order of circuit elements or other features illustrated in the drawings or described herein need not be arranged in the particular way illustrated and described. Many other arrangements are possible according to some embodiments.

In each system shown in a figure, the elements in some cases may each have a same reference number or a different reference number to suggest that the elements represented could be different or similar. However, an element may be flexible enough to have different implementations and work with some or all of the systems shown or described herein. The various elements shown in the figures may be the same or different. Which one is referred to as a first element and which is called a second element is arbitrary.

Examples are given. Example 1 is a method of managing sensors in a system by a computing device. The method includes determining health operation states of the sensors correlative with accuracy of the sensors, wherein sampling frequency of the sensors to determine the health operation states is dynamic; classifying the sensors by their respective health operation state, wherein the health operation states comprise a healthy (H) state, an unhealthy (U) state, and an intermediate state in which sensed data is less accurate than the H state and more accurate than the U state; and teaming two sensors each having the intermediate state to give a team having the H state.

Example 2 includes the method of example 1, including or excluding optional features. In this example, classifying the sensors comprises real-time classification of operating sensors, wherein sensor data from an H state sensor is substantially accurate, and wherein sensor data from a U state sensor data is not acceptable.

Example 3 includes the method of any one of examples 1 to 2, including or excluding optional features. In this example, determining health operation states of the sensors comprises a bootstrap sampling frequency for new sensors brought on line.

Example 4 includes the method of any one of examples 1 to 3, including or excluding optional features. In this example, determining health operation states of the sensors comprises parametrizing an environment in which the sensors are disposed.

Example 5 includes the method of any one of examples 1 to 4, including or excluding optional features. In this example, determining health operation states comprising the dynamic sampling frequency comprises sampling the sensors and comparing sampled data against a reference sensor, wherein the H state is defined as an accuracy of sensor data of at least 90%, and wherein the intermediate state comprises multiple intermediate states comprising a moderately healthy (M) state and a weak healthy (W) state. Optionally, for an M state sensor, some sensed data is accurate and other sensed data is inaccurate, or sensed data deviation from accurate follows a pattern, or a combination thereof. Optionally, the method includes associating an M state sensor with an H state sensor to reduce exposure of the H state sensor; determining a domain for which the M state sensor is substantially accurate; deactivating the H state sensor in response to the M state sensor readings occurring in the domain; and activating the H state sensor in response to the M state sensor readings occurring outside of the domain. Optionally, the method includes increasing the sampling frequency of a sensor correlative with increasing deployment duration of the sensor; and treating a grouping of multiple W state sensors as a single logical sensor in H state or M state, wherein a W state sensor cannot be used alone. Optionally, the method includes accelerating increasing the sampling frequency in response to the sensor reporting abnormal values. Optionally, the method includes accelerating increasing the sampling frequency in response to greater utilization of a sensitive part of the sensor.

Example 6 includes the method of any one of examples 1 to 5, including or excluding optional features. In this example, the method includes isolating data from a U state sensor, wherein the system comprises an IoT system, wherein the sensors comprise IoT sensors, and wherein the computing device comprises an IoT gateway device, a cloud computing device, or an IoT smart sensor.

Example 7 includes the method of any one of examples 1 to 6, including or excluding optional features. In this example, determining health operation states of sensors comprises an adaptive assessment of sensor health in which the sampling frequency of a sensor is a function of accuracy drift of a sensor or of probability the sensor will remain in a current health operation state, or a combination thereof.

Example 8 is a system for sensing data. The system includes sensors to measure the data; and a sensor manager to determine health operation states of the sensors and classify the sensors by their respective health operation state, wherein the health operation states comprise a healthy (H) state, an unhealthy (U) state, and an intermediate state in which sensed data is less accurate than for the H state and more accurate than for the U state, and wherein the sensor manager to team two sensors each having the intermediate state to give a team having the H state.

Example 9 includes the system of example 8, including or excluding optional features. In this example, the sensor manager is code stored in memory of the system and executable by a processor of the system, wherein the H state is in which sensor data is substantially accurate, and the U state is in which sensor data is not usable.

Example 10 includes the system of any one of examples 8 to 9, including or excluding optional features. In this example, the system includes a gateway device to receive the data from the sensors and provide the data to a cloud infrastructure, wherein the sensor manager is disposed in the cloud infrastructure or on the gateway device, or a combination thereof, and wherein the system comprises an Internet of Things (IoT) system and the sensors comprise IoT sensors.

Example 11 includes the system of any one of examples 8 to 10, including or excluding optional features. In this example, to determine health operation states comprises to sample the sensors and compare sampled data against a reference sensor, wherein sampling frequency is dynamic, wherein the H state is defined as an accuracy of sensor data of at least 90%, and wherein the intermediate state comprises multiple intermediate states comprising a moderately healthy (M) state and a weak healthy (W) state. Optionally, for an M state sensor, some sensed data is accurate and other sensed data is inaccurate, or sensed data deviation from accurate follows a pattern, or a combination thereof. Optionally, the sensor manager to: team an M state sensor with an H state sensor to reduce exposure of the H state sensor; deactivate the H state sensor in response to the M state sensor readings occurring in a domain for which the M state sensor is substantially accurate; and activate the H state sensor in response to the M state sensor readings occurring outside of the domain. Optionally, to determine health operation states comprises to implement increasing sampling frequency of a sensor correlative with increasing deployment duration of the sensor. Optionally, to determine health operation states comprises to accelerate increasing sampling frequency in response to the sensor reporting abnormal values or in response to greater utilization of a sensitive part of the sensor, or a combination thereof.

Example 12 includes the system of any one of examples 8 to 11, including or excluding optional features. In this example, the sensor manager to group multiple W state sensors as a single logical sensor in H state or M state, and wherein to determine health operation states of sensors comprises an adaptive assessment of sensor health in which sampling frequency of a sensor is a function of accuracy drift of a sensor or of probability the sensor will remain in a current health operation state, or a combination thereof.

Example 13 is a tangible, non-transitory, computer-readable medium. The computer-readable medium includes instructions that direct the processor to determine and assign health operation states of sensors in a system correlative with accuracy of the sensors, wherein the health operation states comprise a healthy (H) state that is substantially accurate, an unhealthy (U) state, and an intervening state less accurate than the H state and more accurate than the U state, wherein to determine health operation states of sensors comprises an adaptive assessment of sensor health in which sampling frequency of a sensor to determine accuracy is a function of accuracy drift of a sensor or of probability the sensor will remain in a current health operation state, or a combination thereof; increase sampling frequency of a sensor correlative with increasing deployment duration of the sensor; and team two sensors each having the intervening state to give a team having the H state.

Example 14 includes the computer-readable medium of example 13, including or excluding optional features. In this example, an H state sensor is capable of sensing accurately alone outside of a team of sensors, and wherein to determine health operation states comprises to accelerate increasing sampling frequency in response to the sensor reporting abnormal values or in response to greater utilization of a sensitive part of the sensor, or a combination thereof.

Example 15 includes the computer-readable medium of any one of examples 13 to 14, including or excluding optional features. In this example, to determine health operation states comprises to sample the sensors and compare sampled data against a reference sensor, wherein the sampling frequency is dynamic, wherein the H state comprises an accuracy of sensor data of at least 90%, and wherein the intervening state comprises multiple intervening states comprising a moderately healthy (M) state and a weak healthy (W) state, wherein for an M state sensor, some sensed data is accurate and other sensed data is inaccurate. Optionally, instructions that, when executed by a processor, direct the processor to: team an M state sensor with an H state sensor to reduce exposure of the H state sensor;

deactivate the H state sensor in response to the M state sensor readings occurring in a domain for which the M state sensor is substantially accurate; activate the H state sensor in response to the M state sensor readings occurring outside of the domain; and group multiple W state sensors as a single logical sensor in H state or M state.

Example 16 is a method of managing sensors in a system by a computing device. The method includes instructions that direct the processor to determining health operation states of the sensors correlative with accuracy of the sensors, wherein sampling frequency of the sensors to determine the health operation states is dynamic; classifying the sensors in real time operation of the sensors by their respective health operation state, wherein the health operation states comprise a healthy (H) state, an unhealthy (U) state, and an intermediate state in which sensed data is less accurate than the H state and more accurate than the U state, wherein sensor data from an H state sensor is substantially accurate, and wherein sensor data from a U state sensor data is not acceptable; and teaming two sensors each having the intermediate state to give a team having the H state.

Example 17 includes the method of example 16, including or excluding optional features. In this example, determining health operation states comprising the dynamic sampling frequency comprises sampling the sensors and comparing sampled data against a reference sensor, wherein the H state is defined as an accuracy of sensor data of at least 90%, wherein the intermediate state comprises multiple intermediate states comprising a moderately healthy (M) state and a weak healthy (W) state, and wherein for an M state sensor, some sensed data is accurate and other sensed data is inaccurate, or sensed data deviation from accurate follows a pattern, or a combination thereof. Optionally, the method includes associating an M state sensor with an H state sensor to reduce exposure of the H state sensor; determining a domain for which the M state sensor is substantially accurate; deactivating the H state sensor in response to the M state sensor readings occurring in the domain; and activating the H state sensor in response to the M state sensor readings occurring outside of the domain. Optionally, the method includes increasing the sampling frequency of a sensor correlative with increasing deployment duration of the sensor, or in response to the sensor reporting abnormal values, or in response to greater utilization of a sensitive part of the sensor, or any combinations thereof; and treating a grouping of multiple W state sensors as a single logical sensor in H state or M state, wherein a W state sensor cannot be used alone. Optionally, the method includes isolating data from a U state sensor, wherein the system comprises an IoT system, wherein the sensors comprise IoT sensors, and wherein the computing device comprises an IoT gateway device, a cloud computing device, or an IoT smart sensor. Optionally, determining health operation states of sensors comprises an adaptive assessment of sensor health in which the sampling frequency of a sensor is a function of accuracy drift of a sensor or of probability the sensor will remain in a current health operation state, or a combination thereof.

Example 18 is a system for sensing data. The system includes instructions that direct the processor to sensors to measure the data; and a sensor manager to determine health operation states of the sensors and classify the sensors by their respective health operation state, wherein the health operation states comprise a healthy (H) state, an unhealthy (U) state, and an intermediate state in which sensed data is less accurate than for the H state and more accurate than for the U state, wherein the sensor manager comprises code stored in memory of the system and executable by a processor of the system, wherein the H state is in which sensor data is substantially accurate, and the U state is in which sensor data is not usable, and wherein the sensor manager to team two sensors each having the intermediate state to give a team having the H state.

Example 19 includes the system of example 18, including or excluding optional features. In this example, the system includes a gateway device to receive the data from the sensors and provide the data to a cloud infrastructure, wherein the sensor manager is disposed in the cloud infrastructure or on the gateway device, or a combination thereof, and wherein the system comprises an Internet of Things (IoT) system and the sensors comprise IoT sensors.

Example 20 includes the system of any one of examples 18 to 19, including or excluding optional features. In this example, to determine health operation states comprises to sample the sensors and compare sampled data against a reference sensor, wherein sampling frequency is dynamic, wherein the H state is defined as an accuracy of sensor data of at least 90%, wherein the intermediate state comprises multiple intermediate states comprising a moderately healthy (M) state and a weak healthy (W) state, and wherein for an M state sensor, some sensed data is accurate and other sensed data is inaccurate, or sensed data deviation from accurate follows a pattern, or a combination thereof.

Example 21 includes the system of any one of examples 18 to 20, including or excluding optional features. In this example, the sensor manager to: team an M state sensor with an H state sensor to reduce exposure of the H state sensor; deactivate the H state sensor in response to the M state sensor readings occurring in a domain for which the M state sensor is substantially accurate; activate the H state sensor in response to the M state sensor readings occurring outside of the domain; and group multiple W state sensors as a single logical sensor in H state or M state. Optionally, to determine health operation states comprises to implement increasing sampling frequency of a sensor correlative with increasing deployment duration of the sensor, or to implement increasing sampling frequency in response to the sensor reporting abnormal values, or to implement increasing sampling frequency in response to greater utilization of a sensitive part of the sensor, or any combinations thereof.

Example 22 is a method of managing sensors in a system by a computing device. The method includes instructions that direct the processor to determining health operation states of the sensors correlative with accuracy of the sensors, wherein sampling frequency of the sensors to determine the health operation states is dynamic; classifying the sensors by their respective health operation state, wherein the health operation states comprise a healthy (H) state, an unhealthy (U) state, and an intervening state in which sensed data is less reliable than the H state and more reliable than the U state; and teaming two sensors each having the intervening state to give a team having the H state.

Example 23 includes the method of example 22, including or excluding optional features. In this example, classifying the sensors comprises real-time classification of operating sensors.

Example 24 includes the method of any one of examples 22 to 23, including or excluding optional features. In this example, sensor data from an H state sensor is substantially accurate, and wherein sensor data from a U state sensor data is not acceptable.

Example 25 includes the method of any one of examples 22 to 24, including or excluding optional features. In this example, the method includes isolating data from a U state sensor.

Example 26 includes the method of any one of examples 22 to 25, including or excluding optional features. In this example, determining health operation states of the sensors comprises a bootstrap sampling frequency for new sensors brought on line.

Example 27 includes the method of any one of examples 22 to 26, including or excluding optional features. In this example, determining health operation states of the sensors comprises parametrizing an environment in which the sensors are disposed.

Example 28 includes the method of any one of examples 22 to 27, including or excluding optional features. In this example, determining health operation states comprising the dynamic sampling frequency comprises sampling the sensors and comparing sampled data against a reference sensor Example 29 includes the method of any one of examples 22 to 28, including or excluding optional features. In this example, the H state is defined as an accuracy of sensor data of at least 90%.

Example 30 includes the method of any one of examples 22 to 29, including or excluding optional features. In this example, the method includes increasing the sampling frequency of a sensor correlative with increasing deployment duration of the sensor. Optionally, the method includes accelerating increasing the sampling frequency in response to the sensor reporting abnormal values. Optionally, the method includes accelerating increasing the sampling frequency in response to greater utilization of a sensitive part of the sensor.

Example 31 includes the method of any one of examples 22 to 30, including or excluding optional features. In this example, the intervening state comprises multiple intervening states comprising a moderately healthy (M) state and a weak healthy (W) state. Optionally, for an M state sensor, some sensed data is accurate and other sensed data is inaccurate. Optionally, for an M state sensor, at least some sensed data deviation from accurate follows a pattern. Optionally, the method includes associating an M state sensor with an H state sensor to reduce exposure of the H state sensor; determining a domain for which the M state sensor is substantially accurate; deactivating the H state sensor in response to the M state sensor readings occurring in the domain; and activating the H state sensor in response to the M state sensor readings occurring outside of the domain. Optionally, the method includes treating a grouping of multiple W state sensors as a single logical sensor in H state or M state, wherein a W state sensor cannot be acceptably used alone.

Example 32 includes the method of any one of examples 22 to 31, including or excluding optional features. In this example, the system comprises an IoT system, wherein the sensors comprise IoT sensors, and wherein the computing device comprises an IoT gateway device, a cloud computing device, or an IoT smart sensor.

Example 33 includes the method of any one of examples 22 to 32, including or excluding optional features. In this example, determining health operation states of sensors comprises an adaptive assessment of sensor health in which the sampling frequency of a sensor is a function of accuracy drift of a sensor or of probability the sensor will remain in a current health operation state, or a combination thereof.

Example 34 is a tangible, non-transitory, computer-readable medium. The computer-readable medium includes instructions that direct the processor to determine health operation states of the sensors correlative with accuracy of the sensors, wherein sampling frequency of the sensors to determine the health operation states is dynamic; classify the sensors by their respective health operation state, wherein the health operation states comprise a healthy (H) state, an unhealthy (U) state, and an intermediate state in which sensed data is less accurate than the H state and more accurate than the U state; and team two sensors each having the intervening state to give a team having the H state.

Example 35 includes the computer-readable medium of example 34, including or excluding optional features. In this example, to classify the sensors comprises real-time classification of operating sensors.

Example 36 includes the computer-readable medium of any one of examples 34 to 35, including or excluding optional features. In this example, sensor data from an H state sensor is substantially accurate, and wherein sensor data from a U state sensor data is not acceptable.

Example 37 includes the computer-readable medium of any one of examples 34 to 36, including or excluding optional features. In this example, the instructions, that when executed by the processor, direct the processor to isolate data from a U state sensor.

Example 38 includes the computer-readable medium of any one of examples 34 to 37, including or excluding optional features. In this example, to determine health operation states of the sensors comprises a bootstrap sampling frequency for new sensors brought on line.

Example 39 includes the computer-readable medium of any one of examples 34 to 38, including or excluding optional features. In this example, to determine health operation states of the sensors comprises parametrizing an environment in which the sensors are disposed.

Example 40 includes the computer-readable medium of any one of examples 34 to 39, including or excluding optional features. In this example, to determine health operation states including the dynamic sampling frequency comprises sampling the sensors and comparing sampled data against a reference sensor Example 41 includes the computer-readable medium of any one of examples 34 to 40, including or excluding optional features. In this example, the H state comprises an accuracy of sensor data of at least 90%.

Example 42 includes the computer-readable medium of any one of examples 34 to 41, including or excluding optional features. In this example, the instructions, that when executed by the processor, direct the processor to increase the sampling frequency of a sensor correlative with increasing deployment duration of the sensor. Optionally, the instructions, that when executed by the processor, direct the processor to accelerate increasing the sampling frequency in response to the sensor reporting abnormal values. Optionally, the instructions, that when executed by the processor, direct the processor to accelerate increasing the sampling frequency in response to greater utilization of a sensitive part of the sensor.

Example 43 includes the computer-readable medium of any one of examples 34 to 42, including or excluding optional features. In this example, the intermediate state comprises multiple intermediate states comprising a moderately healthy (M) state and a weak healthy (W) state. Optionally, for an M state sensor, some sensed data is accurate and other sensed data is inaccurate. Optionally, for an M state sensor, at least some sensed data deviation from accurate follows a pattern. Optionally, the instructions, that when executed by the processor, direct the processor to: associate an M state sensor with an H state sensor to reduce exposure of the H state sensor; determine a domain for which the M state sensor is substantially accurate; deactivate the H state sensor in response to the M state sensor readings occurring in the domain; and activate the H state sensor in response to the M state sensor readings occurring outside of the domain. Optionally, the instructions, that when executed by the processor, direct the processor to treat a grouping of multiple W state sensors as a single logical sensor in H state or M state, wherein a W state sensor cannot be acceptably used alone.

Example 44 includes the computer-readable medium of any one of examples 34 to 43, including or excluding optional features. In this example, the system comprises an IoT system, wherein the sensors comprise IoT sensors, and wherein the computing device comprises an IoT gateway device, a cloud computing device, or an IoT smart sensor.

Example 45 includes the computer-readable medium of any one of examples 34 to 44, including or excluding optional features. In this example, to determine health operation states of sensors comprises an adaptive assessment of sensor health in which the sampling frequency of a sensor is a function of accuracy drift of a sensor or of probability the sensor will remain in a current health operation state, or a combination thereof.

Example 46 is a system for managing operating sensors. The system includes instructions that direct the processor to means for determining health operation states of the sensors correlative with accuracy of the sensors, wherein sampling frequency of the sensors to determine the health operation states is dynamic; means for classifying the sensors by their respective health operation state, wherein the health operation states comprise a healthy (H) state, an unhealthy (U) state, and an intermediate state in which sensed data is less accurate than the H state and more accurate than the U state; and means for teaming two sensors each having the intermediate state to give a team having the H state.

Example 47 includes the system of example 46, including or excluding optional features. In this example, sensor data from an H state sensor is substantially accurate, and wherein sensor data from a U state sensor data is not acceptable. Optionally, the system includes means for isolating data provided by a U state sensor.

Example 48 includes the system of examples 46 to 47, including or excluding optional features. In this example, the means for determining health operation states of the sensors to accommodate a bootstrap sampling frequency for new sensors brought on line.

Example 49 includes the system of examples 46 to 48, including or excluding optional features. In this example, the means for determining health operation states of the sensors parametrizes an environment in which the sensors are disposed.

Example 50 includes the system of examples 46 to 49, including or excluding optional features. In this example, the means for determining health operation states implements the dynamic sampling frequency comprises sampling the sensors and comparing sampled data against a reference sensor. Optionally, the H state comprises an accuracy of sensor data of at least 90%.

Example 51 includes the system of examples 46 to 50, including or excluding optional features. In this example, the means for determining health operation states to implement increasing the sampling frequency of a sensor correlative with increasing deployment duration of the sensor. Optionally, the means for determining health operation states to accelerate increasing the sampling frequency in response to the sensor reporting abnormal values. Optionally, the means for determining health operation states to accelerate increasing the sampling frequency in response to greater utilization of a sensitive part of the sensor.

Example 52 includes the system of examples 46 to 51, including or excluding optional features. In this example, the intermediate state comprises multiple intermediate states comprising a moderately healthy (M) state and a weak healthy (W) state. Optionally, for an M state sensor, some sensed data is accurate and other sensed data is inaccurate. Optionally, for an M state sensor, at least some sensed data deviation from accurate follows a pattern. Optionally, the system includes means for associating an M state sensor with an H state sensor to reduce exposure of the H state sensor; means for determining a domain for which the M state sensor is substantially accurate; means for deactivating the H state sensor in response to the M state sensor readings occurring in the domain; and means for activating the H state sensor in response to the M state sensor readings occurring outside of the domain. Optionally, the system includes means for treating a grouping of multiple W state sensors as a single logical sensor in H state or M state, wherein a W state sensor cannot be acceptably used alone.

Example 53 includes the system of examples 46 to 52, including or excluding optional features. In this example, the system comprises an IoT system, wherein the sensors comprise IoT sensors, and wherein the computing device comprises an IoT gateway device, a cloud computing device, or an IoT smart sensor.

Example 54 includes the system of examples 46 to 53, including or excluding optional features. In this example, the means for determining health operation states of sensors to implement an adaptive assessment of sensor health in which the sampling frequency of a sensor is a function of accuracy drift of a sensor or of probability the sensor will remain in a current health operation state, or a combination thereof.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus comprising:
at least one memory;
machine readable instructions; and
processor circuitry to execute the machine readable instructions to:
acquire, at a bootstrap frequency, first sample data corresponding to a first device;
when the first sample data is not sufficient to classify the first device, acquire second sample data corresponding to the first device at a second frequency greater than the bootstrap frequency;
classify a health status of the first device based on third sample data corresponding to a reference device, the health status of the first device at least one of a healthy state, an intermediate state or a weak state; and cause an increase in at least one of the bootstrap frequency or the second frequency, the increase based on a deployment duration corresponding to the first device.

2. The apparatus as defined in claim 1, wherein the processor circuitry is to combine the first device with a second device to generate a combined output when the health status of the first device is the intermediate state.

3. The apparatus as defined in claim 2, wherein the combined output of the first device and the second device exhibits an accuracy greater than an output of individual ones of the first device and the second device.

4. The apparatus as defined in claim 1, wherein the processor circuitry is to cause a change in the bootstrap frequency based on an accuracy value of the first device.

5. The apparatus as defined in claim 4, wherein the processor circuitry is to cause the change in the bootstrap frequency as a function of a rate of the accuracy value change.

6. A non-transitory machine readable storage medium comprising instructions that, when executed, cause processor circuitry to at least:
   obtain first sample data at a bootstrap frequency, the first sample data corresponding to a first device;
   obtain second sample data corresponding to the first device based on insufficient first sample data, the second sample data obtained at a second frequency greater than the bootstrap frequency;
   determine a health status of the first device based on third sample data corresponding to a reference device, the health status of the first device at least one of a healthy state, an intermediate state or a weak state; and
   change the bootstrap frequency based on an accuracy value of the first device.

7. The non-transitory machine readable storage medium as defined in claim 6, wherein the instructions, when executed, cause the processor circuitry to combine the first device with a second device to generate a combined output when the health status of the first device is the intermediate state.

8. The non-transitory machine readable storage medium as defined in claim 7, wherein the instructions, when executed, cause the processor circuitry to cause the second device to generate an output accuracy greater than an output of individual ones of the first device and the second device.

9. The non-transitory machine readable storage medium as defined in claim 6, wherein the instructions, when executed, cause the processor circuitry to increase at least one of the bootstrap frequency or the second frequency, the increase based on a deployment duration corresponding to the first device.

10. The non-transitory machine readable storage medium as defined in claim 6, wherein the instructions, when executed, cause the processor circuitry to change the bootstrap frequency based on a rate of the accuracy value change.

11. A method to classify a device health status comprising:
   acquiring, by executing an instruction with processor circuitry, first sample data at a bootstrap frequency, the first sample data associated with a first device;
   acquiring, by executing an instruction with the processor circuitry, when the first sample data is insufficient to classify the device health status, second sample data associated with the first device, the second sample data acquired at a second frequency greater than the bootstrap frequency;
   classifying, by executing an instruction with the processor circuitry, a health status of the first device based on third sample data associated with a reference device, the health status of the first device at least one of a healthy state, an intermediate state or a weak state; and
   increasing, by executing an instruction with the processor circuitry, the bootstrap frequency or the second frequency based on a deployment duration corresponding to the first device.

12. The method as defined in claim 11, further including combining the first device with a second device to generate a combined output when the health status of the first device is the intermediate state.

13. The method as defined in claim 12, wherein the combined output of the first device and the second device exhibits an accuracy greater than an output of individual ones of the first device and the second device.

14. The method as defined in claim 11, further including adjusting the bootstrap frequency based on an accuracy value of the first device.

15. The method as defined in claim 14, further including changing the bootstrap frequency as a function of a rate of the accuracy value change.

* * * * *